US011129200B2

(12) United States Patent
Takeda et al.

(10) Patent No.: US 11,129,200 B2
(45) Date of Patent: Sep. 21, 2021

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/317,124

(22) PCT Filed: Jul. 14, 2017

(86) PCT No.: PCT/JP2017/025737
§ 371 (c)(1),
(2) Date: Jan. 11, 2019

(87) PCT Pub. No.: WO2018/012619
PCT Pub. Date: Jan. 18, 2018

(65) Prior Publication Data
US 2019/0306888 A1 Oct. 3, 2019

(30) Foreign Application Priority Data

Jul. 15, 2016 (JP) .............................. JP2016-140716
Aug. 12, 2016 (JP) .............................. JP2016-158890

(51) Int. Cl.
*H04W 74/08* (2009.01)
*H04W 72/04* (2009.01)
*H04W 16/28* (2009.01)

(52) U.S. Cl.
CPC ....... *H04W 74/0833* (2013.01); *H04W 16/28* (2013.01); *H04W 72/046* (2013.01); *H04W 74/08* (2013.01)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 10,820,355 B2 * 10/2020 Hui ................... H04W 74/0833
2009/0191875 A1 * 7/2009 Vujcic ............... H04W 74/0866
455/436
(Continued)

FOREIGN PATENT DOCUMENTS

JP 2015532805 A 11/2015
SE WO 2016/049840 A1 * 4/2016 ............ H04W 52/42
WO 2016/049840 A1 4/2016

OTHER PUBLICATIONS

3GPP TSG-RAN WG2 Meeting #94, R2-163372, Nanjing, China, May 23-27, 2016, Agenda item: 9.4.3.2.4, Source: Samsung, Title: Random Access Procedure in NR (Year: 2016).*
(Continued)

*Primary Examiner* — Peter G Solinsky
*Assistant Examiner* — Sanjay K Dewan
(74) *Attorney, Agent, or Firm* — Osha Bergman Watanabe & Burton LLP

(57) ABSTRACT

To perform a random access procedure appropriately in communication using beamforming.
A user terminal for communicating with a radio base station using a plurality of beams includes: a transmission section that transmits a random access preamble; a reception section that receives a random access response corresponding to the random access preamble; and a control section that controls transmission of the random access preamble and/or reception of the random access response using given resources associated with a plurality of beam patterns.

5 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2015/0173004 A1* | 6/2015 | Nigam | ................ | H04W 56/001 370/331 |
| 2015/0208443 A1* | 7/2015 | Jung | ................... | H04W 72/042 370/329 |
| 2015/0289219 A1* | 10/2015 | Kim | ................... | H04W 56/0005 370/350 |
| 2016/0157267 A1* | 6/2016 | Frenne | ................... | H04W 16/28 370/329 |
| 2017/0244460 A1* | 8/2017 | Li | ........................ | H04W 72/042 |
| 2018/0184391 A1* | 6/2018 | Ly | ........................ | H04L 27/2657 |
| 2018/0279380 A1* | 9/2018 | Jung | ................ | H04W 56/0005 |
| 2019/0069256 A1* | 2/2019 | Jung | ................ | H04W 72/0453 |
| 2019/0223124 A1* | 7/2019 | Tang | ................ | H04W 74/0833 |
| 2019/0268947 A1* | 8/2019 | Zhang | .............. | H04W 74/0833 |
| 2020/0044709 A1* | 2/2020 | Kang | ................ | H04B 17/318 |
| 2020/0059878 A1* | 2/2020 | Huang | ................ | H04W 72/046 |
| 2020/0154377 A1* | 5/2020 | Qian | ........................ | H04B 7/00 |
| 2020/0267768 A1* | 8/2020 | Hakola | ................ | H04L 5/0048 |
| 2020/0296765 A1* | 9/2020 | Kim | ................... | H04W 74/0833 |

OTHER PUBLICATIONS

International Search Report issued in PCT/JP2017/025737 dated Sep. 5, 2017 (1 page).
Written Opinion of the International Searching Authority issued in PCT/JP2017/025737 dated Sep. 5, 2017 (4 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Samsung; "Random Access Procedure in NR"; 3GPP TSG-RAN WG2 Meeting #94, R2-163372; Nanjing, China; May 23-27, 2016 (7 pages).
Extended European Search Report issued in counterpart European Patent Application No. 17827742.2, dated Jan. 30, 2020 (8 pages).
Office Action issued in the counterpart European Patent Application No. 17827742.2, dated Oct. 27, 2020 (5 pages).
Office Action issued in the counterpart Australian Patent Application No. 2017295096, dated Apr. 30, 2021 (3 pages).
Office Action issued in Japanese Application No. 2018-527684; dated Jun. 1, 2021 (6 pages).

* cited by examiner

USER TERMINAL AND RADIO COMMUNICATION METHOD

TECHNICAL FIELD

The present invention relates to a user terminal and a radio communication method in the next-generation mobile communication system.

BACKGROUND ART

In UMTS (Universal Mobile Telecommunications System) networks, for the purpose of higher data rates, low latency and the like, Long Term Evolution (LTE) has been specified (Non-patent Document 1). In addition, for the purpose of wider bands and higher speed than LTE (also referred to as LTE Rel. 8 or 9), LTE-A (also referred to as LTE Advanced, LTE Rel. 10, 11 or 12) has been specified, and also a successor system to LTE (also referred to as, for example, FRA (Future Radio Access), 5G (5th generation mobile communication system), NR (New Radio), NX (New radio access), FX (Future generation radio access), LTE Rel. 13, 14, 15 and later) is under study.

In LTE Rel. 10/11, Carrier Aggregation (CA) that aggregates a plurality of Component Carriers (CC) is introduced in order to widen the band. Each CC is formed in units of LTE Rel. 8 system bands. Additionally, in CA, a plurality of CCs of a same radio base station (eNB: eNodeB) are set in a user terminal (UE: User Equipment).

On the other hand, Dual connectivity (DC) in which a plurality of Cell Groups (CG) of different radio base stations are set in the UE is also introduced in the LTE Rel. 12. Each cell group includes at least one cell (CC). Since a plurality of CC of different radio base stations are aggregated in DC, DC is also referred to as inter-base station CA (Inter-eNB CA).

Additionally, in an existing LTE system (for example, LTE Rel. 8-13), transmission of UL data from a user terminal is allowed in a case where UL synchronization has been established between the radio base station and the user terminal. Accordingly, a random access procedure (also referred to as RACH procedure: Random Access Channel Procedure, or access procedure) for establishing UL synchronization is supported in an existing LTE system.

In the random access procedure, the user terminal acquires information relating to a UL transmission timing (Timing Advance (TA), in a response (random access response) from the radio base station to a randomly selected preamble (random access preamble), and establishes UL synchronization on the basis of the TA.

The user terminal, after having established UL synchronization, receives Downlink Control Information (DCI) (UL grant) from radio base station and subsequently, using UL resources allocated by the UL grant, transmits UL data.

CITATION LIST

Non-Patent Literature

[Non-Patent Literature 1. 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

It is expected with future radio communication systems (for example, 5G, NR) that various radio communication services will be realized so as to satisfy different required conditions (for example, ultra-speed, large capacity, ultra-low latency, etc.), respectively.

For example, with 5G, provision of radio communication services referred to as eMBB (enhanced Mobile Broad Band), IoT (Internet of Things), MTC (Machine Type Communication), M2M (Machine To Machine), URLLC (Ultra Reliable and Low Latency Communications) is under study. Note that M2M may also be referred to as D2D (Device To Device), V2V (Vehicle To Vehicle), depending on the apparatus used for communication. In order to satisfy the requirements for the various types of communication described above, designing a new communication access scheme (New RAT (Radio Access Technology)) is under study.

In 5G, it is under study to use a very high carrier wave frequency, for example 100 GHz, to provide service. Generally, the higher the carrier wave frequency is, the more difficult it becomes to secure coverage. This is because distance attenuation becomes significant so that the straightness of radio wave is strengthened, or transmission power density decreases due to super wide-band transmission.

Accordingly, in order to satisfy the requirements for the above-mentioned various types of communication also in high frequency zones, employment of Massive MIMO (Multiple Input Multiple Output) that uses a super multi-element antenna is under study. It is possible with a super multi-element antenna to form a beam (antenna directivity) by controlling the amplitude and/or phase of signals being transmitted/received from respective elements. The processing, which is also referred to as Beam Forming (BF), makes it possible to reduce radio wave propagation loss.

Although a plurality of operations (for example, messages 1 to 4 in the case of collision-based random access) are defined in an existing random access procedure, it has not yet been determined how to apply BF. When simply applying BF, it becomes necessary to transmit, while applying different beams, each of the beams for a plurality of times. Therefore when performing BF in a manner applying a large number of beam patterns in a random access procedure, there may be an increase of overhead and/or latency of communication.

The present invention has been made in view of such a respect, and it is an object of the invention to provide a user terminal and a radio communication method capable of appropriately performing a random access procedure in communication using beamforming.

Solution to Problem

A user terminal according to an aspect of the present invention is a user terminal for communicating with a radio base station using a plurality of beams, and is characterized by having a transmission section that transmits a random access preamble; a reception section that receives a random access response corresponding to the random access preamble; and a control section that controls transmission of the random access preamble and/or reception of the random access response using given resources associated with a plurality of beam patterns.

Advantageous Effects of Invention

According to the present invention, it is possible to appropriately perform a random access procedure in communication using beamforming.

DESCRIPTION OF EMBODIMENTS

Existing LTE systems (for example, LTE Rel. 8-13) support random access procedures for establishing UL synchronization. Random access procedures include Collision-Based Random Access (CBRA: also referred to as Contention-Based Random Access and the like) and Non-Collision-Based Random Access (Non-CBRA, also referred to as CFRA: Contention-Free Random Access and the like).

With Collision-Based Random Access (CBRA), a user terminal transmits a preamble randomly selected from a plurality of preambles defined for each cell (also referred to as Random Access Preamble, Random Access Channel (Physical Random Access Channel: PRACH), RACH preamble, etc.). In addition, Collision-Based Random Access is a user-terminal-initiated random access procedure and may be used at the time of initial access, starting or resuming UL transmission and the like, for example.

With Non-Collision-Based Random Access (Non-CBRA, CFRA: Contention-Free Random Access), on the other hand, a radio base station allocates a preamble uniquely to a user terminal via a downlink (DL) control channel (PDCCH: Physical Downlink Control Channel, EPDCCH: Enhanced PDCCH, etc.), and the user terminal transmits the preamble allocated to from the radio base station. Non-Collision-Based Random Access is a network-initiated random access procedure, and may be used at the time of handover, starting or resuming DL transmission (starting or resuming transmission on UL of DL retransmission instruction information) and the like, for example.

Figure 1:
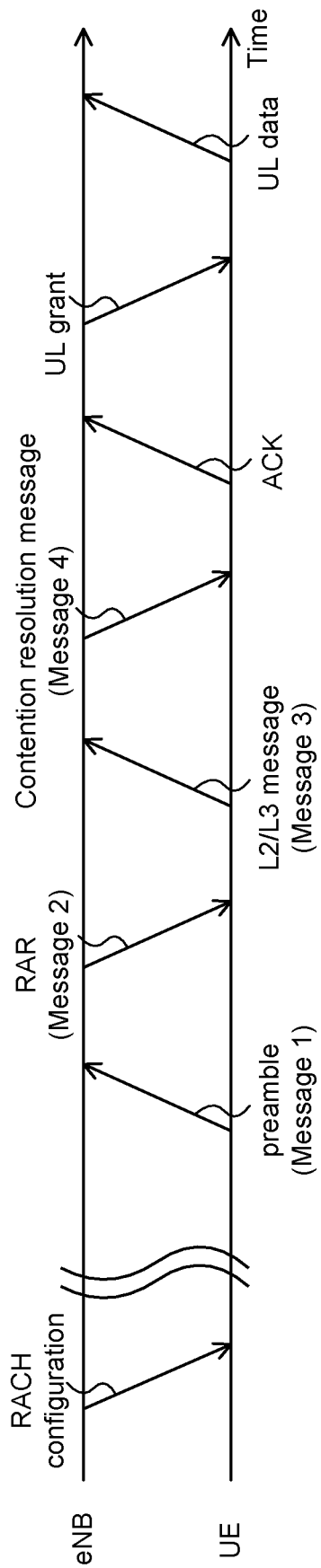
FIG. 1 shows an example of a Collision-Based Random Access procedure.

FIG. 1 shows an example of Collision-Based Random Access. In FIG. 1, a user terminal preliminarily receives information (PRACH configuration information) indicating a configuration (PRACH configuration, RACH configuration) of a random access channel (PRACH), via system information (for example, MIB (Mater Information Block) and/or SIB (System Information Block)) and upper layer signaling (for example, RRC (Radio Resource Control) signaling).

The PRACH configuration information may indicate, for example, a plurality of preambles (for example, preamble format) defined for respective cells, time resources (for example, system frame number, subframe number) used for PRACH transmission, and frequency resources (for example, an offset (prach-Frequency Offset) indicating the start position of a six-resource block (PRB: Physical Resource Block)), and the like.

When transiting (for example, at the time of initial access) from an idle (RRC_IDLE) state to an RRC_CONNECTED state, as shown in FIG. 1, a user terminal randomly selects one of a plurality of preambles indicated by the PRACH configuration information in a case where UL synchronization has not been established (for example, at the time of starting or resuming UL transmission and the like), and transmits the selected preamble on the PRACH (message 1).

The radio base station, upon detecting the preamble, transmits a Random Access Response (RAR) (message 2) as a response thereto. The user terminal, upon failing in reception of the RAR within a predetermined period (RAR window) after transmission of the preamble, increases the transmission power of the PRACH and transmits (retransmits) the preamble again. Note that increasing the transmission power when performing retransmission is referred to as power ramping.

The user terminal which has received the RAR adjusts the UL transmission timing on the basis of timing advance (TA) included in the RAR, and establishes UL synchronization. In addition, the user terminal transmits a control message (message 3) of an upper layer (L2/L3: Layer 2/Layer 3) using UL resources specified by the UL grant included in the RAR. The control message includes an identifier (UE-ID) of the user terminal. The identifier of the user terminal may be, for example, a C-RNTI (Cell-Radio Network Temporary Identifier) when in an RRC_connected state, or may be a UE-ID of an upper layer such as an S-TMSI (System Architecture Evolution-Temporary Mobile Subscriber Identity) when in an idle state.

The radio base station transmits a collision solving message (message 4), in accordance with the control message of the upper layer. The collision solving message is transmitted on the basis of the identifier of the user terminal included in the control message. A user terminal which has successfully detected collision solving message transmits an affirmative response (ACK: Acknowledge) in the HARQ (Hybrid Automatic Repeat reQuest) to the radio base station. As a result, the user terminal in an idle state transits to an RRC_connected state.

On the other hand, a user terminal which has failed in detecting the collision solving message determines that a collision has occurred, selects a preamble again, and repeats the random access procedure of messages 1 to 4. The radio base station, upon detecting by an ACK from the user terminal that the collision has been solved, transmits a UL grant to the user terminal. The user terminal reads UL data, using UL resources allocated by the UL grant.

With Collision-Based Random Access such as for described above, the user terminal is capable of autonomously starting a random access procedure when transmission of UL data is desired. In addition, UL data is transmitted using UL resources allocated uniquely to the user terminal by the UL grant after UL synchronization has been established, whereby highly reliable UL transmission becomes possible.

It is expected with future radio communication systems (for example, 5G, NR) to realize various radio communication services so as to satisfy respectively different required conditions (for example, ultra-high speed, large capacity, ultra-low latency, etc.) respectively. For example, with future radio communication systems, communication using Beam Forming (BF) is under study, as has been described above.

BF may be classified into digital BF and analog BF. Digital BF is a method of performing precoding signal processing (on digital signals) over the baseband. In this case, as many parallel processes of Inverse Fast Fourier Transform (IFFT)/Digital to Analog Converter (DAC)/RF (Radio Frequency) as the number of antenna ports (RF chain) becomes necessary. On the other hand, it is possible to form as many beams as the number of RF chains at any timing.

Analog BF is a method of using a phase shifter on RF. In this case, although the configuration may be easily realized at a low price because only the phase rotation of RF signals is required, it is impossible to form a plurality of beams at a same timing. Specifically, with analog BF, it is possible to form only one beam at a time in each phase shifter.

Accordingly, in a case where the base station (referred to as, for example, an eNB (evolved Node B), a BS (Base Station), etc.) has only one phase shifter, the number of beams that may be formed during a certain time period turns out to be one. Therefore, since it is impossible to perform transmission simultaneously using the same resources when transmitting a plurality of beams using only analog BF, it is necessary to temporally switch or rotate beams.

Note that there may also be a hybrid BF configuration with combined digital BF and analog BF. Although introduction of large-scale MIMO is under study in future radio communication systems (for example, 5G), forming an enormous number of beams only by digital BF results in an expensive circuit configuration. Accordingly, use of the hybrid BF configuration is assumed in 5G.

Figure 2A:
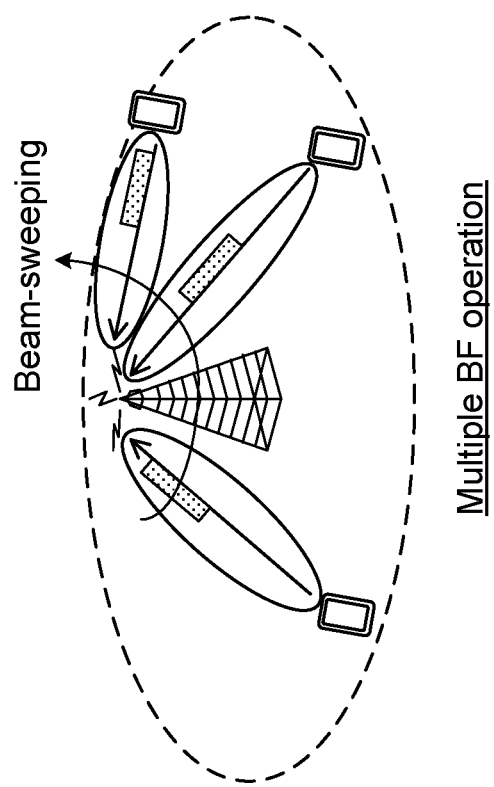
FIG. 2A shows an example of single BF.
Figure 2B:
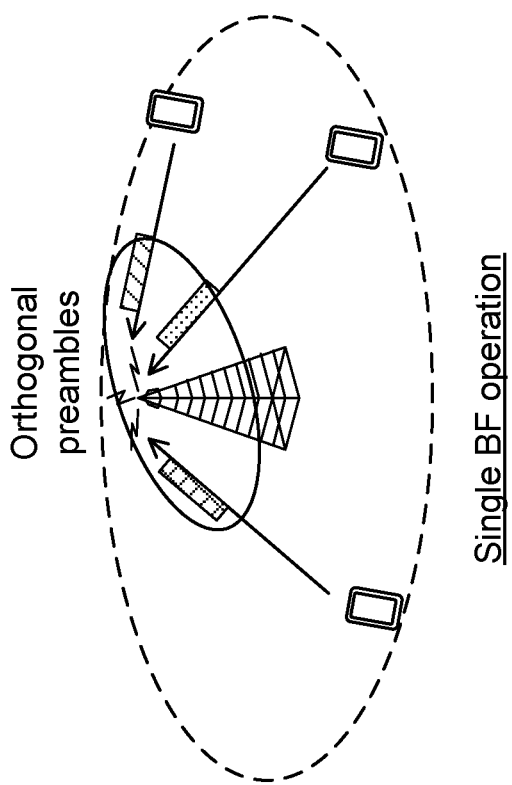
FIG. 2B shows an example of multiple BF.
Figures 3A, 3B, 3C:
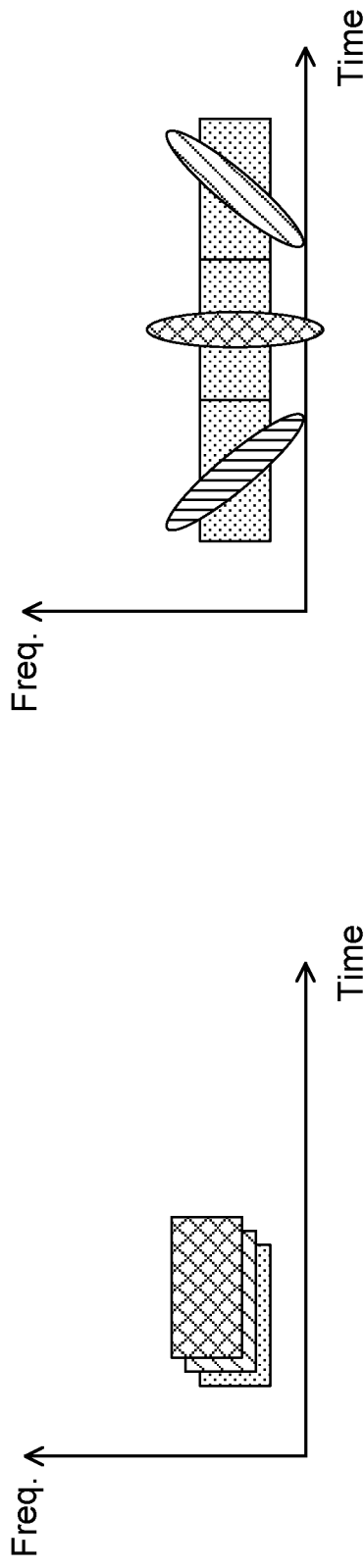
FIG. 3A shows an example of single BF.
FIGS. 3B and 3C show an example of multiple BF.

As BF operations, there are Single BF operation in which a single BF is used and Multiple BF operation in which a plurality of BFs are used (see FIGS. 2 and 3). In UL transmission using single BF operation, Orthogonal preambles is applied so that UL beams cross at right angles (avoid collision) among a plurality of user terminals (see FIGS. 2A and 3A).

In UL transmission which uses multiple BF operation, BF is applied so that UL beams cross at right angles (avoid collision) among a plurality of user terminals. For example, it is conceivable to perform transmission for a plurality of times, while applying (sweeping) different beam patterns in the time direction (see FIGS. 2B, 3B and C). FIG. 3B shows an example of multiple BF operation in a radio base station (also referred to as gNB), and FIG. 3C shows an example of multiple BF operation in a radio base station and user terminals.

By the way, in an existing LTE system, a radio base station has been required to periodically transmit signals (for example, Synchronization Signal (SS), Broadcast Channel (BCH), System Information (SI), etc.) for cell detection (cell detection), initial access, and the like, regardless of the presence or absence of a UE.

In order to simply realize coverage extension, it is conceivable to perform transmission for a plurality of times while applying (sweeping) different BFs on all of the signals. As a result, a UE may receive a signal to which a beam appropriate for the UE has been applied, and communicate with the base station using an appropriate beam after completion of initial access.

On the other hand, it is conceivable to apply multiple BF also on the above-mentioned random access procedure. However, it has not yet been determined how to apply BF to respective operations (messages 1 to 4) of the random access procedure. Therefore, the inventors of the present invention have come up with controlling transmission/reception of signals by setting resources (for example, time resources) respectively corresponding to respective beam patterns in respective operations of the random access procedure. Hereinafter, an example of a random access procedure to which multiple BF has been applied will be described, referring to FIG. 4.

Figure 4:
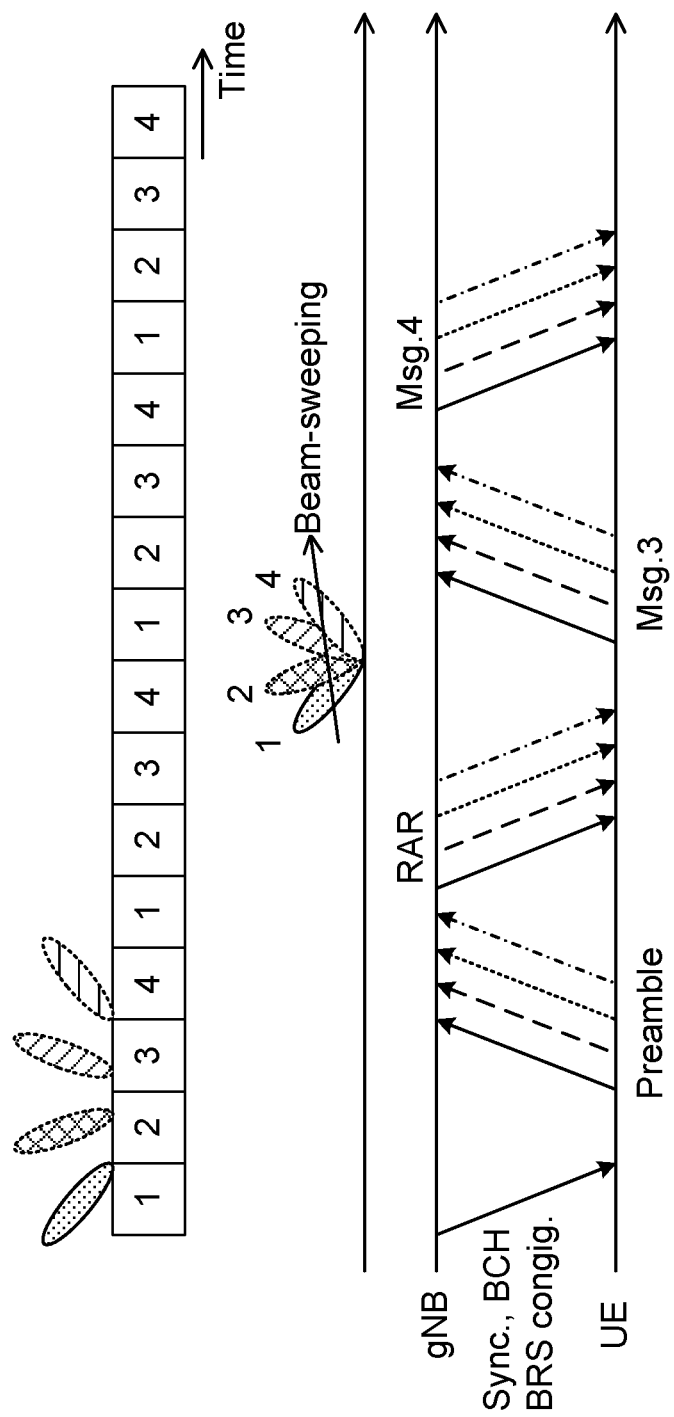
FIG. 4 shows an example of a random access procedure when applying multiple BF.

FIG. 4 shows an example of a case where multiple BF using four beam patterns is applied in a random access procedure. Here, a case of respectively applying (sweeping) four beam patterns to different time intervals (for example, symbols) in respective operations (Msg. 1 to Msg. 4) of a random access procedure is assumed. In respective operations, the resources associated with respective beam patterns may be predefined, or may be notified to the user terminal of from the radio base station.

Before transmitting a random access preamble (PRACH), the user terminal receives, from the radio base station, setting information (BRS config.) relating to a synchronization channel, a broadcast channel (broadcast signal), and a reference signal for measuring a beam pattern to be applied. The radio base station may transmit a synchronization signal and/or broadcast channel to which each beam pattern has been applied, or transmit a reference signal (BRS: Beam Reference Signal) for measuring a beam to which each beam pattern has been applied. The user terminal is capable of selecting a predetermined beam pattern (beam index), on the basis of the result of measurement of a signal to which the beam pattern has been applied, and setting information relating to the reference signal for measuring the beam pattern.

The user terminal selects a predetermined beam pattern on the basis of the result of measurement of a received beam, and transmits a PRACH using resources (for example, time resources) which is set in accordance with the selected beam pattern. Here, a case is shown where respective beam patterns #1 to #4 (beam index #1 to #4) and the transmission timing of a PRACH (for example, time resources used for PRACH transmission) are set in association with each other.

FIG. 4 shows a case where the user terminal selects the beam pattern #1 and transmits the PRACH using resources (for example, time resources) corresponding to the beam pattern #1. The radio base station is capable of grasping the beam index selected by the user terminal, on the basis of the time resources (for example, transmission timing) used by the user terminal for PRACH transmission.

The radio base station which has received the PRACH transmits a RAR (Msg. 2) for the PRACH to the user terminal. The radio base station transmits the RAR using resources (for example, time resources) corresponding to the beam pattern (here, beam pattern #1) used for PRACH transmission. The user terminal receives the RAR using resources set in accordance with the beam pattern selected at the time of PRACH transmission.

Similarly, the radio base station and the user terminal control transmission/reception using resources (for example, time resources) which is set in accordance with a predetermined a beam pattern (here, beam pattern #1), also for Msg. 3 and/or Msg. 4. As thus described, it is possible to perform a random access procedure using the beam pattern selected by the user terminal (used for PRACH transmission).

When, On the other hand, applying multiple BF to the random access procedure, there is also assumed a case of performing BF using a large number of beam patterns depending on the carrier frequency, communication environment, and the form of service. In this case, there arises a need to repeatedly transmit (sweep) a variety of signals/channels in the time direction for as many times as the large number of beam patterns in respective operations of the random access procedure, which may result in a large signaling overhead. In addition, the random access procedure takes a long time when repeatedly transmitting a large number of beam patterns in respective operations, and there may cause latency.

For example, when applying 14 beam patterns, it becomes necessary to perform beam switching 14 times in order to sweep all the beams in respective operations. Such a problem has a larger effect as the number of beam patterns applied increases. Therefore, there is desired a method of reducing the signaling overhead and processing time when performing a random access procedure by applying multiple BF (for example, using a large number of beam patterns).

The inventors have paid attention in that, when applying a large number of beam patterns, there exists beam patterns similar to each other (for example, a plurality of beam patterns receivable by a certain user terminal), and a plurality of beam patterns may be classified into several groups. The inventors therefore have come up with setting resources (for example, time resources) to a plurality of beam groups including different beam patterns, and performing the random access procedure using resources which are set to the beam group of interest.

An aspect of the present embodiment lies in setting resources (for example, time resources) corresponding to more than one beam patterns, and performing a random access procedure. Alternatively, resources (for example, time resources) are set to a beam group resulted from classifying and grouping a plurality of beam patterns, and subsequently a random access procedure is performed. In this case, it is possible to set a smaller number of random access resources than the beam patterns. The random access procedure may be at least one of Msg. 1 to Msg. 4. As thus described, setting predetermined resources to a plurality of beam patterns (beam groups respectively including a plurality of beam patterns) makes it possible to suppress the increase of signaling overhead and/or latency of processing in comparison with the case of respectively setting resources to each of a plurality of beam patterns.

Grouping of beam patterns may be performed by defining a group with beam patterns being preliminarily classified on the basis of a predetermined rule, or notified from the radio base station to the user terminal. For example, a plurality of beams (beam patterns) included in a same beam group may be formed by beams of similar beam patterns. Alternatively, there may be a configuration in which a plurality (for example, more than one) of beam patterns (beam indices, etc.) are set for setting information of one RACH.

Hereinafter, embodiments according to the present invention will be described in detail, referring to the drawings. The radio communication methods according to respective embodiments may be respectively applied alone, or may be applied in combination.

Although, in the present specification, the difference among a plurality of beams (beam patterns) is intended to be such that, for example, at least one of the following elements (1) to (6) to be respectively applied to a plurality of beams is different, the invention is not limited thereto: (1) precoding, (2) transmission power, (3) phase rotation (4) beam width, (5) angle of beam (for example, tilt angle) and (6) number of layers. Note that, in a case where the precoding is different, the precoding weight may be different, or the precoding scheme (for example, linear precoding or non-linear precoding) may be different. When applying linear/non-linear precoding to a beam, the transmission power, phase rotation, and number of layers may also vary.

As an example of linear precoding, there may be mentioned precoding conforming to the Zero-Forcing (ZF) criterion, Regularized Zero-Forcing (R-ZF) criterion, Minimum Mean Square Error (MMSE) criterion, and the like. In addition, as an example of non-linear precoding, there may be mentioned precoding such as Dirty Paper Coding (DPC), Vector Perturbation (VP) and Tomlinson Harashima Precoding (THP). Note that precoding to be applied is not limited thereto.

(Aspect 1)

Aspect 1 describes a case of setting resources (for example, time resources) to a beam group to control transmission/reception during a part of the operation (Msg. 1 to Msg. 3) of a random access procedure. In other words, there is described a case of setting a plurality of beam patterns to a single resource in a corresponding manner to control transmission/reception in the random access procedure. Note that, in the following description, although a case of grouping four beam patterns into two beam groups (alternatively, a case of associating a single resource with two beam patterns) is taken as an example, the number of applicable beam patterns, the number of beam groups, and the number of beam patterns included in each beam group are not limited thereto.

Figure 5:
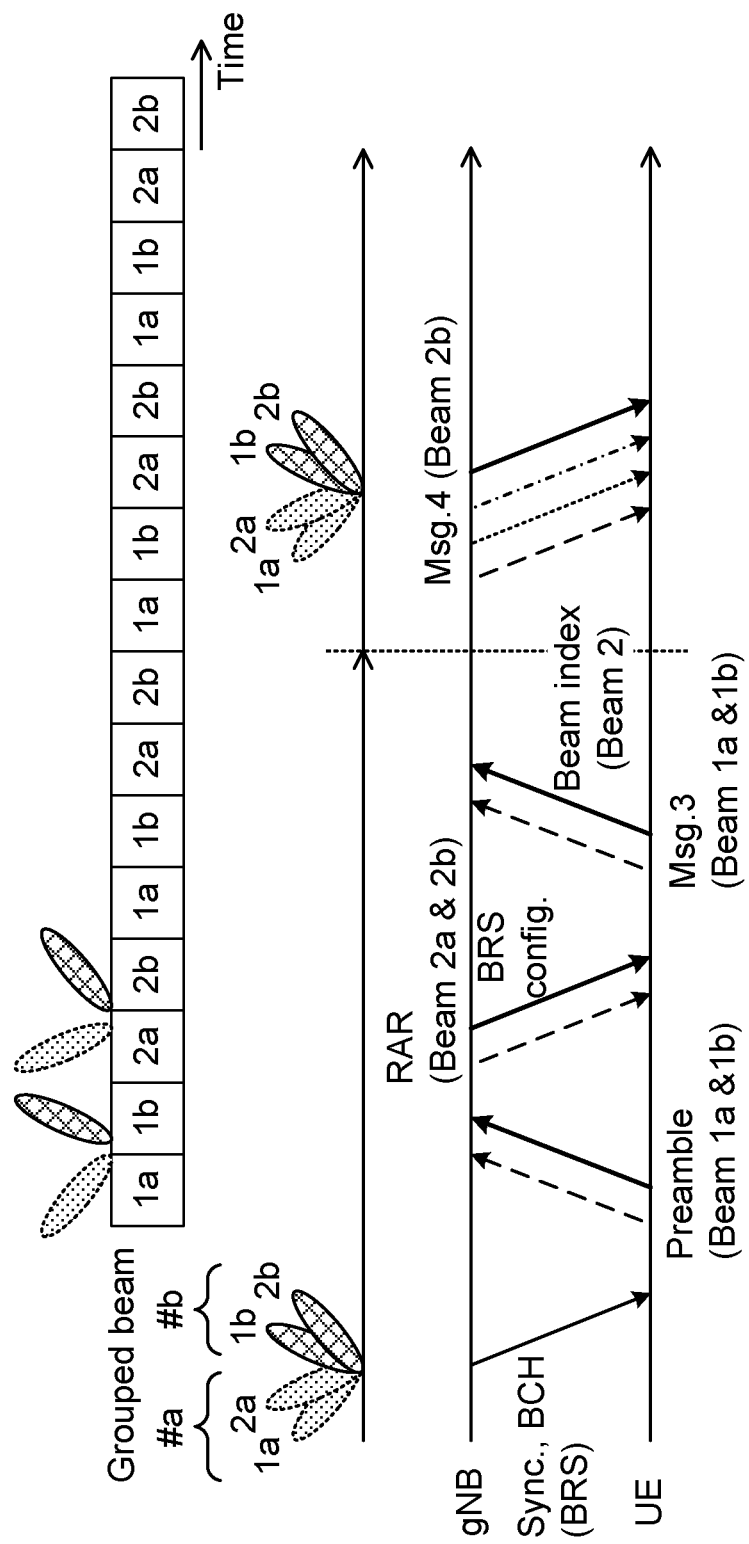
FIG. 5 shows another example of a random access procedure when applying multiple BF.

FIG. 5 shows an example of a random access procedure in the first aspect. Here, four beam patterns (1a, 2a, 1b and 2b) are grouped into two beam groups #a and #b. The beam group #a includes the beam patterns 1a and 2a, and the beam group #b includes the beam patterns 1b and 2b.

First, prior to transmitting a random access preamble (PRACH), the user terminal receives a synchronization signal and a broadcast channel (for example, system information, etc.). The radio base station (referred to as an eNB or a gNB) may apply BF to the synchronization signal and/or the broadcast channel and transmit the same. In this case, the radio base station applies the four beam patterns to the synchronization signal and/or the broadcast channel, and transmits (sweeps) the same in different time domains, respectively.

Alternatively, the radio base station may transmit a Beam Reference Signal (BRS). In this case, the radio base station is capable of applying predetermined beam patterns (for example, four beam patterns) to the BRS and the transmitting (sweeping) the same in different time domains, respectively.

When transmitting one of the synchronization signal, broadcast channel, and beam reference signal using BF, it is possible to set resources (for example, frequency resources and/or time resources) to be used for transmission in association with each beam pattern. In this case, a plurality of beams (here, four beam patterns) may be associated with a resource, or a beam group may be associated with a resource.

The user terminal measures a plurality of beams or a plurality of beam groups, on the basis of at least one of the synchronization, signal broadcast channel, and beam reference signal to which BF has been applied. The user terminal selects a predetermined beam group, on the basis of the result of measurement (and/or predetermined conditions, etc.). For example, the user terminal is capable of receiving a plurality of synchronization signals to which BF has been applied, and selecting a beam group to which a beam index or a beam pattern with the highest received power belongs.

The user terminal transmits a PRACH using the resources (for example, time resources) of the PRACH, which is set in accordance with the selected beam index or beam group. In other words, the resources to be used for PRACH transmission is set in accordance with a plurality of beam indices or beam groups (#a and #b). FIG. 5 shows a case where the user terminal selects the beam group #b and performs PRACH transmission using the time resources associated with the beam group #b. The time resources may include a predetermined time interval (for example, subframe, symbol, ordinary TTI (1 ms), shortened TTI, etc.).

The radio base station and/or the user terminal applies one of the beam patterns included in the beam group #b in the time resources associated with the beam group #b (beam patterns 1b and 2b) to control transmission/reception. FIG. 5 shows a case where the radio base station and/or the user terminal controls transmission/reception of the PRACH using the beam pattern 1b in the time resources associated with the beam group #b. There is shown a case for the time resources associated with the beam group #a where the radio base station controls the reception of the PRACH using the beam pattern 1a.

The user terminal which has transmitted the PRACH receives, at a predetermined timing, a random access response (RAR) transmitted from the radio base station in response to the PRACH transmission. For example, the radio base station applies a predetermined beam to a single resource which is set to a plurality of beam indices or resources set to respective beam groups, and transmits the RAR. Specifically, the radio base station transmits the RAR to the user terminal, using the resources associated with the beam group of the PRACH transmitted from the user terminal.

As thus described, resources to be used for RAR transmission may be set in accordance with a plurality of beam indices or beam groups (#a and #b), instead of a single beam index. FIG. 5 shows a case where the radio base station selects the beam group #b, and performs RAR transmission in the time resources associated with the beam group #b.

The radio base station and/or the user terminal applies one of the beam patterns included in the beam group #b in the time resources associated with the beam group #b to control transmission/reception of the RAR. FIG. 5 shows a case where the radio base station controls transmission of the RAR using the beam pattern 2b in the time resources associated with the beam group #b. Note that there is shown a case where the radio base station controls transmission of the RAR using the beam pattern 2a in the time resources associated with the beam group #a.

In addition, in a case where transmission resources of the RAR are set regardless of beam indices, the radio base station transmits the RAR using arbitrary resources. In such a case, the user terminal which has transmitted the PRACH attempts to receive the RAR during a constant interval. Here, a fixed interval (for example, RAR window) during which the RAR is received may be preliminarily determined, or may be notified to the user terminal via an upper layer signal such as broadcast information and/or RRC signaling. As a result, the user terminal is allowed to receive the RAR appropriately even in a case where transmission resources of the RAR are set regardless of beam indices.

In addition, the radio base station is capable of transmitting, in a manner included in the RAR, setting information (BRS configuration and BRS config.) relating to the reference signal for beam pattern measurement. For example, the radio base station notifies the user terminal of information relating to the BRS configuration in a manner included in downlink control information (UL grant) and/or downlink shared channel to be transmitted in the RAR.

The user terminal is capable of grasping beam patterns (beam indices) included in respective beam groups, on the basis of the information relating to the BRS configuration included in the RAR. In addition, the user terminal is capable of specifying, from a plurality of beam patterns, an index of a beam which is preferably available for BF (for example, a beam pattern with the highest received power). Here, a case is shown where the user terminal selects a beam pattern included in the beam group #2 (beam index #2). As the beam index, a number common to respective beam groups may be applied, or different numbers may be applied.

Additionally, in a case where transmission resources of the message 3 (Msg. 3) are set regardless of beam indices, the radio transmission station is capable of transmitting, in a manner included in the RAR, information relating to the transmission timing of the message 3. The time elapsed since the timing of receiving the RAR (number of subframes, etc.) may be used as the information relating to the transmission timing.

The user terminal which has received the RAR transmits the message 3 (Msg. 3) to the UL grant included in the RAR on the basis of an instruction. Specifically, the user terminal is capable of transmitting Msg. 3 using resources which are set in accordance with a plurality of beam indices or a predetermined beam group (here, beam group #2). In other words, the resources to be used for transmission of Msg. 3 are set in accordance with a plurality of beam indices or beam groups (#a and #b).

Alternatively, the message 3 may be transmitted on the basis of the information relating to the transmission timing included in the UL grant of the RAR.

FIG. 5 shows a case where the user terminal selects the beam group #b, and transmits Msg. 3 in the time resources associated with the beam group #b. The radio base station and/or the user terminal applies one of the beam patterns included in the beam group #b in the time resources associated with the beam group #b to control transmission/reception. FIG. 5 shows a case where the radio base station and/or the user terminal controls transmission/reception of Msg. 3 using the beam pattern 1b in the time resources associated with the beam group #b.

Additionally, in a case where information relating to the BRS configuration is included in the RAR, the user terminal measures the most appropriate beam index using the BRS on the basis of the information. The user terminal is capable of transmitting, in a manner included in Msg. 3, information (Beam index) relating to a predetermined beam index. Here, a case is shown where the user terminal notifies the beam pattern (beam index #2) included in the beam group #2. For example, in a case where a beam index common to respective beam groups is applied, the user terminal may transmit only the information relating to the beam index (here, beam index 2) without transmitting the information relating to the beam group. As a result, it is possible to reduce the number of bits to be transmitted.

The radio base station is capable of determining more than one beam index candidate or beam group which are suitable for the user terminal, on the basis of the timing (for example, time resources) of the PRACH transmitted from the user terminal and/or the timing of Msg. 3. In addition, the radio base station is capable of determining a beam index which is suitable for the user terminal, on the basis of a beam index notified from the user terminal. The radio base station is capable of determining a particular beam pattern (here, beam pattern 2b) to be applied to the user terminal, on the basis of such information.

The radio base station controls transmission of the message 4 (Msg. 4) using a particular beam pattern (here, beam pattern 2b). For example, the radio base station transmits Msg. 4 to the user terminal using the resources associated with a particular beam pattern determined on the basis of the information notified from the user terminal. The user terminal receives Msg. 4 transmitted from the radio base station in the resources associated with the beam pattern 2b.

As thus described, resources to be used for transmission of Msg. 4 may be set in accordance with respective beam patterns (beam indices). FIG. 5 shows a case where the radio base station selects the beam pattern 2b, and transmits Msg. 4 in the time resources associated with the beam pattern 2b.

In this case, the radio base station is capable of transmitting Msg. 4 by applying a beam pattern which turns out to be most suitable for the user terminal, whereby it is possible to improve the reception quality in the user terminal. As shown in FIG. 5, transmission/reception is controlled in terms of beam groups during Msg. 1 to Msg. 3, whereas transmission/reception is controlled in terms of beam patterns during Msg. 4. As a result, it is possible to suppress the latency and/or the increase of signaling overhead in the entire random access procedure, and also improve the precision signal reception during and after Msg. 4 in the user terminal.

(Aspect 2)

Aspect 2 describes a case of setting resources (for example, time resources) to a beam group to control transmission/reception during the entire operation (Msg. 1 to Msg. 4) of a random access procedure. In other words, there is described a case of setting a plurality of beam patterns to a single resource in a corresponding manner to control transmission/reception in the random access procedure. Note that, in the following description, although a case of grouping four beam patterns into two beam groups (alternatively, a case of associating a single resource with two beam patterns) is taken as an example, the number of applicable beam patterns, the number of beam groups, and the number of beam patterns included in each beam group are not limited thereto.

Figure 6:
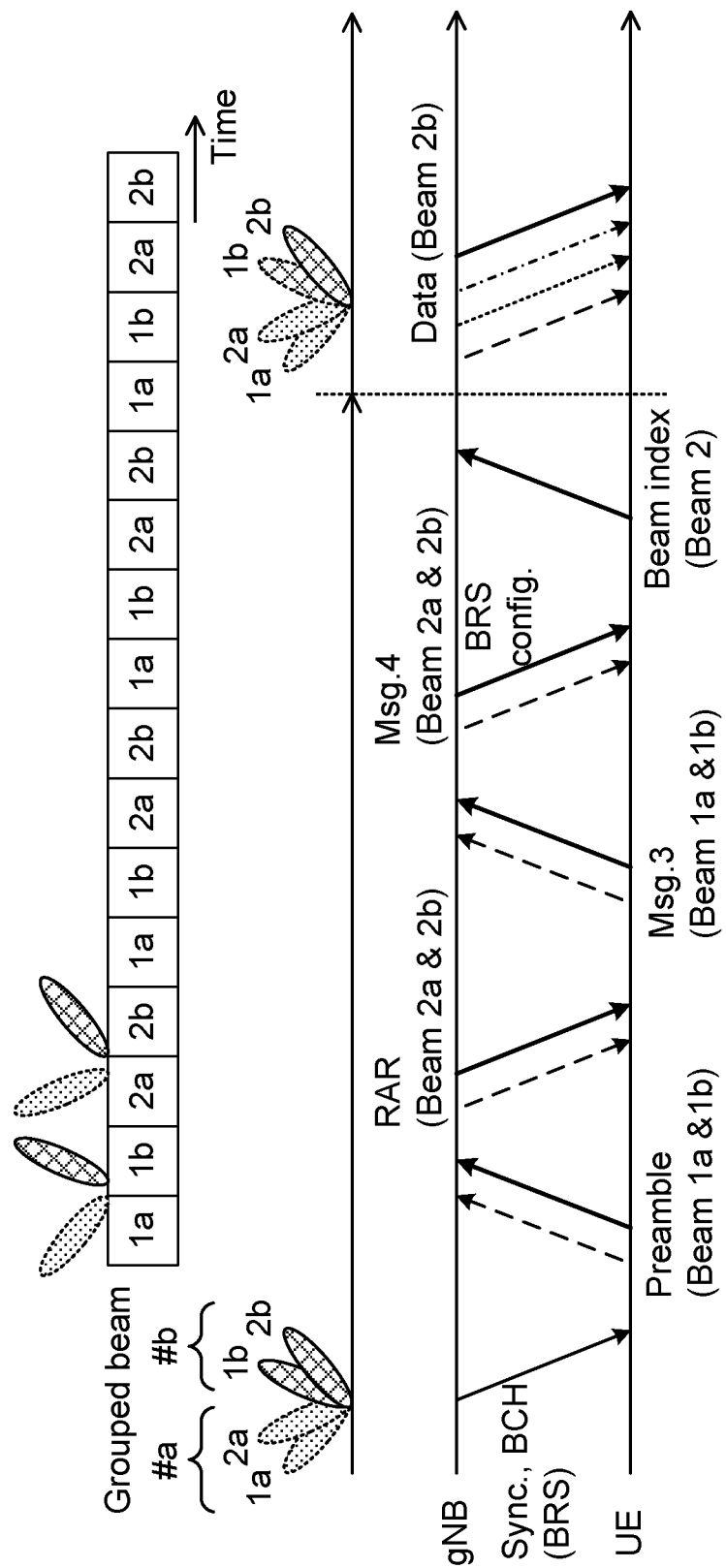
FIG. 6 shows another example of a random access procedure when applying multiple BF.

FIG. 6 shows an example of a random access procedure in the second aspect. Here, four beam patterns (1a, 2a, 1b and 2b) are grouped into two beam groups #a and #b. The beam group #a includes the beam patterns 1a and 2a, and the beam group #b includes the beam patterns 1b and 2b.

Msg. 1 to Msg. 3 may be applied to similar operation as those in FIG. 5. However, the difference from FIG. 5 lies in that the setting information (BRS config.) relating to the reference signal for beam pattern measurement is transmitted during Msg. 4 instead of Msg. 2 (RAR), and that information (Beam index) relating to a predetermined beam index is transmitted during and after Msg. 4 instead of Msg. 3.

The user terminal which has transmitted Msg. 3 receives, at a predetermined timing, Msg. 4 transmitted from the radio base station. For example, the radio base station transmits Msg. 4 to the user terminal using the resources associated with the beam group of the PRACH (and, Msg. 3) transmitted from the user terminal.

As thus described, resources to be used for transmission of Msg. 4 may be set in accordance with a plurality of beam indices or beam groups (#a and #b). FIG. 6 shows a case where the radio base station selects the beam group #b (beam patterns 1b and 2b), and transmits Msg. 4 in the time resources associated with the beam group #b.

The radio base station and/or the user terminal applies one of the beam patterns included in the beam group #b in the time resources associated with the beam group #b to control transmission/reception of Msg. 4. FIG. 6 shows a case where the radio base station controls transmission of Msg. 4 using the beam pattern 2b in the time resources associated with the beam group #b.

In addition, the radio base station is capable of transmitting, in a manner included in Msg. 4, setting information (BRS config.) relating to the reference signal for beam pattern measurement. The user terminal is capable of grasping the beam patterns (beam indices) included in respective beam groups, on the basis of the information relating to the BRS configuration included in Msg. 4. In addition, the user terminal is capable of identifying, among a plurality of beam patterns, an index of a beam (for example, beam pattern with the highest received power) which is preferably available for BF. Here, a case is shown where the user terminal selects a beam pattern (beam index #2) included in the beam group #2.

The user terminal which has received Msg. 4 is capable of transmitting information (Beam index) relating to a predetermined beam index. Here, a case is shown where the user terminal notifies the beam pattern (beam index #2) included in the beam group #2. Note that the user terminal may transmit only the information relating to the beam index (here, beam index 2) without transmitting information relating to the beam group. As a result, it is possible to reduce the number of bits to be transmitted.

The radio base station is capable of determining a beam group which is suitable for the user terminal on the basis of the timing (for example, time resources) of the PRACH transmitted from the user terminal, and/or the timing of Msg. 3. In addition, the radio base station is capable of determining a beam index suitable for the user terminal, on the basis of the beam index notified from the user terminal. The radio base station is capable of determining a particular beam pattern (here, beam pattern 2b) to be applied to the user terminal, on the basis of such information.

The radio base station controls transmission of DL data after RRC connection, using a particular beam pattern (here, beam pattern 2b). For example, the radio base station transmits DL data to the user terminal in the resources associated with the beam pattern 2b among the resources which are set to respective beam patterns. The user terminal receives DL data transmitted from the radio base station using the resources associated with the beam pattern 2b.

As thus described, the resources to be used for transmission and/or reception of signals after RRC connection may be set in accordance with respective beam patterns. In this case, the radio base station is capable of transmitting DL data by applying a beam pattern which turns out to be most suitable for the user terminal, whereby it is possible to improve the reception quality in the user terminal.

As shown in FIG. 6, transmission/reception is controlled in terms of beam groups in the random access procedure (Msg. 1 to Msg. 4), and transmission/reception is controlled in terms of beam patterns in the communication after the random access procedure. As a result, it is possible to suppress the latency and/or the increase of signaling overhead in the random access procedure, and improve the reception precision of DL data in the user terminal after the random access procedure.

Note that, although a case has been shown in the foregoing description where transmission/reception is controlled by setting resources (for example, time resources) to a beam group in Msg. 1 to Msg. 3, the embodiment is not limited thereto. It suffices to control transmission/reception by setting resources to a beam group in at least one of respective operations (Msg. 1 to Msg. 4) of the random access procedure.

Additionally, a collision-based random access has been shown in the foregoing description as the random access procedure, a non-collision-based random access may be similarly applied.

(Radio Communication System)

Hereinafter, a configuration of a radio communication system according to an embodiment of the present invention will be described. In the radio communication system, communication is performed using one or a combination of the radio communication methods according to the above-mentioned respective embodiments of the present invention.

Figure 7:
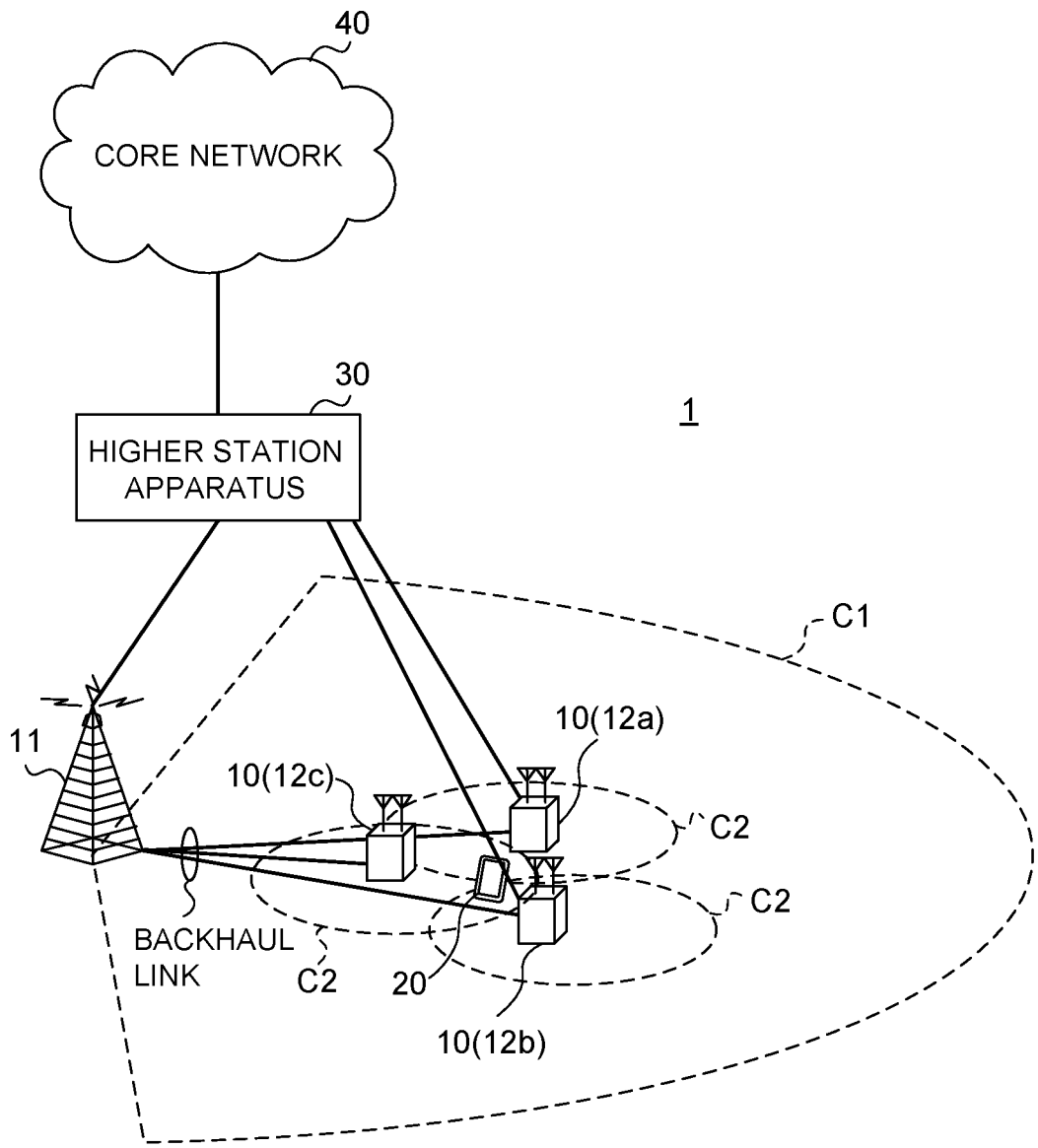
FIG. 7 shows an example of a schematic configuration of a radio communication system according to an embodiment of the present invention.

FIG. 7 shows an example of a schematic configuration of a radio communication system according to an embodiment of the present invention. In a radio communication system 1, it is possible to apply Carrier Aggregation (CA) and/or Dual Connectivity (DC) having aggregated therein a plurality of basic frequency blocks (component carriers) in units of the system bandwidth (for example, 20 MHz) of the LTE system.

Note that the radio communication system 1 may also be referred to as LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), or may be referred to as a system that realizes them.

The radio communication system 1 includes a radio base station 11 forming a macrocell C1 having a relatively wide coverage, and radio base stations 12 (12a to 12c) provided inside the macrocell C1 and forming small cells C2 which are smaller than the macro cell C1. In addition, the macrocell C1 and the respective small cells C2 have a user terminal 20 provided therein.

The user terminal 20 is connectable to both the radio base station 11 and the radio base stations 12. It is assumed that the user terminal 20 uses simultaneously the macrocell C1 and small cells C2 by CA or DC. In addition, the user terminal 20 may apply CA or DC using a plurality of cells (CC) (for example, five or less CCs, or six or more CCs).

It is possible to perform communication between the user terminal 20 and the radio base station 11 using a carrier (referred to as an existing carrier, a Legacy carrier, etc.) with a narrow bandwidth in a relatively low frequency band (for example, 2 GHz). On the other hand, a carrier with a wide bandwidth may be used between the user terminal 20 and the radio base stations 12 in a relatively high frequency band (for example, 3.5 GHz, 5 GHz, etc.), or the same carrier as that used for communicating with the radio base station 11 may be used. Note that the configuration of the frequency band used by respective radio base stations is not limited thereto.

There may be a configuration providing wired connection (for example, optical fiber, X2 interface and the like, conforming to CPRI (Common Public Radio Interface)) or wireless connection between the radio base station 11 and the radio base stations 12 (or, between two radio base stations).

The radio base station 11 and each of the radio base stations 12 are respectively connected to a higher station apparatus 30, and connected to the core network 40 via the higher station apparatus 30. Note that although the higher station apparatus 30 includes, for example, an access gateway apparatus, a Radio Network Controller (RNC), a Mobility Management Entity (MME) and the like, it is not limited thereto. In addition, each of the radio base stations 12 may be connected to the higher station apparatus 30 via the radio base station 11.

Note that the radio base station 11 is a radio base station having a relatively wide coverage, and may also be referred to as a macro base station, an aggregate node, an eNB (eNodeB), a transmission/reception point, and the like. In addition, the radio base stations 12 is a radio base station having a local coverage, and may also be referred to as a small base station, a micro base station, a pico base station, a femto base station, an HeNB (Home eNodeB), an RRH (Remote Radio Head), a transmission/reception point, and the like. Hereinafter, the radio base stations 11 and 12 may also be collectively referred to as the radio base station 10 when they are not distinguished.

Each of the user terminals 20 is a terminals supporting various communication schemes such as LTE and LTE-A, and may include not only mobile communication terminals (mobile stations), but also fixed communication terminals (fixed stations).

As the radio access scheme in the radio communication system 1, Orthogonal Frequency Division Multiple Access (OFDMA) is applied for downlink, and Single Carrier Frequency Division Multiple Access (SC-FDMA) is applied for uplink.

OFDMA is a multicarrier transmission scheme for dividing a frequency band into a plurality of narrow frequency bands (subcarriers), and mapping data onto each subcarrier to perform communication. SC-FDMA is a single-carrier transmission scheme for dividing a system bandwidth into bands comprised of a single or contiguous resource blocks for each terminal so that a plurality of terminals uses mutually different bands, and thereby reducing interference among terminals. Note that uplink and downlink radio access schemes are not limited to combinations thereof, and other radio access schemes may be used.

In the radio communication system 1, a downlink shared channel (PDSCH: Physical Downlink Shared Channel) shared between each user terminal 20, a broadcast channel (PBCH: Physical Broadcast Channel), a downlink L1/L2 control channel and the like, are used as the downlink channel. User data, upper layer control information, an SIB (System Information Block) and the like are transmitted on the PDSCH. In addition, an MIB (Master Information Block) is transmitted on the PBCH.

Downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel), and the like. Downlink Control Information (DCI) and the like, including scheduling information of the PDSCH and the PUSCH is transmitted on the PDCCH. The number of OFDM symbols to be used in the PDCCH is transmitted on the PCFICH. Receipt confirmation information (may also referred to an, for example, retransmission control information, HARQ-ACK, ACK/NACK and the like) of a HARQ (Hybrid Automatic Repeat reQuest) is transmitted to the PUSCH on the PHICH. The EPDCCH is frequency-division multiplexed with the PDSCH, and used similarly to the PDCCH for transmission of DCI, and the like.

In the radio communication system 1, an uplink shared channel (PUSCH: Physical Uplink Shared Channel) shared between each user terminal 20, an uplink control channel (PUCCH: Physical Uplink Control Channel), a random access channel (PRACH: Physical Random Access Channel) are used as the uplink channel. User data and an upper layers control information are transmitted on the PUSCH. In addition, downlink radio quality information (CQI: Channel Quality Indicator), receipt confirmation information and the like are transmitted on the PUCCH. A random access preamble for establishing connection with a cell is transmitted on the PRACH.

In the radio communication system 1, a Cell-specific Reference Signal (CRS), a Channel State Information-Reference Signal (CSI-RS), a DeModulation Reference Signal (DMRS), a Positioning Reference Signal (PRS) and the like are transmitted as a downlink reference signal. Additionally, in the radio communication system 1, a Sounding Reference Signal (SRS), a Demodulation Reference Signal (DMRS) and the like are transmitted as an uplink reference signal. Note that the DMRS may also be referred to as a UE-specific Reference Signal. In addition, the reference signal to be transmitted is not limited thereto.

(Radio Base Station)

Figure 8:
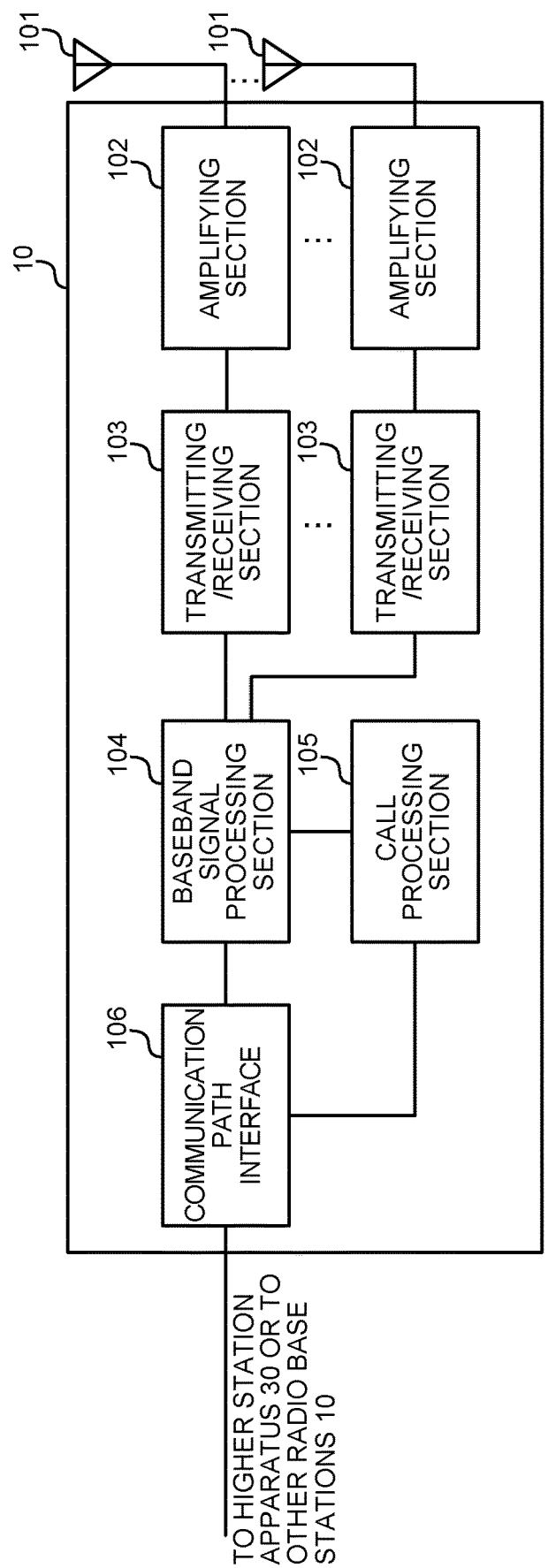
FIG. 8 shows an example of an entire configuration of a radio base station according to an embodiment of the present invention.

FIG. 8 shows an example of an entire configuration of a radio base station according to an embodiment of the present invention. The radio base station 10 is provided with a plurality of transmission/reception antennas 101, amplifying sections 102, transmission/reception sections 103, a baseband signal processing section 104, a call processing section 105, and a transmission path interface 106. Note that it suffices to include, in the configuration, one or more members of the transmission/reception antennas 101, the amplifying sections 102, and the transmission/reception sections 103, respectively.

User data to be transmitted to the user terminal 20 from the radio base station 10 on downlink is input to the baseband signal processing section 104 from the higher station apparatus 30 via the transmission path interface 106.

In the baseband signal processing section 104, the user data is subjected to transmission processing such as: processing of the PDCP (Packet Data Convergence Protocol) layer; segmentation and concatenation of the user data, transmission processing of RLC (Radio Link Control) layer such as RLC retransmission control; MAC (Medium Access Control) retransmission control (for example, transmission processing of a HARQ); scheduling, transmission format selection, channel coding, Inverse Fast Fourier Transform (IFFT) processing; and precoding processing, and transferred to the transmission/reception sections 103. In addition, downlink control signals are also subjected to transmission processing such as channel coding and Inverse Fast Fourier Transform, and transferred to transmission/reception section 103.

The transmission/reception sections 103 convert the baseband signal subjected to precoding for each antenna and output from the baseband signal processing section 104 into a radio-frequency signal, and transmit the converted signal. The radio-frequency signal which has been frequency-converted in the transmission/reception sections 103 is amplified by the amplifying sections 102 and transmitted from the transmission/reception antennas 101. The transmission/reception sections 103 may include a transmitter/receiver, a transmission/reception circuit, or a transmission/reception apparatus, which are described on the basis of a common recognition in the technical field of the present invention. Note that the transmission/reception sections 103 may be formed as an integrated transmission/reception section, or may include a transmission section and a reception section.

On the other hand, with regard to uplink signals, radio-frequency signals received by the transmission/reception antennas 101 are amplified by the amplifying sections 102. The transmission/reception sections 103 receive uplink signals amplified by the amplifying sections 102. The transmission/reception sections 103 perform frequency conversion of the received signals into baseband signals, and output the converted signals to the baseband signal processing section 104.

In the baseband signal processing section 104, the user data included in the input baseband signal is subjected to Fast Fourier Transform (FFT) processing, Inverse Discrete Fourier Transform (IDFT) processing, error correcting decoding, reception processing of MAC retransmission control, and reception processing of RLC layer and PDCP layer, and transferred to the higher station apparatus 30 via the transmission path interface 106. The call processing section 105 performs call processing such as setting and release of a communication channel, state management of the radio base station 10, and management of radio resources. The call processing section 105 performs call processing such as setting and release of a communication channel, state management of the radio base station 10, and management of radio resources.

The transmission path interface 106 transmits and receives signals to and from the higher station apparatus 30 via a predetermined interface. In addition, the transmission path interface 106 may transmit/receive signals (backhaul signaling) to and from another radio base station 10 via an interface between base stations (for example, optical fiber conforming to CPRI (Common Public Radio Interface), X2 interface).

Note that the transmission/reception sections 103 may further have an analogue beamforming section that performs analogue beamforming. The analogue beamforming section may include an analogue beamforming circuit (for example, a phase shifter, a phase shift circuit), or an analogue beamforming apparatus (for example, a phase shifter), which are described on the basis of a common recognition in the technical field of the present invention. In addition, the transmission/reception antennas 101 may be formed as an array antenna, for example.

The transmission/reception sections 103 control reception of Msg. 1 and the Msg. 3, and transmission of Msg. 2 and Msg. 4 in the random access procedure. In addition, the transmission/reception sections 103 may transmit setting information (BRS config.) relating to a reference signal for beam pattern measurement, and/or information relating to a beam index.

Additionally, in a case where transmission resources of the RAR are set regardless of the beam indices, the transmission/reception sections 103 may transmit the RAR in arbitrary resources, and also may transmit information relating to a fixed interval for transmitting the RAR by upper layer signaling (broadcast information and/or RRC signaling, etc.). Additionally, in a case where transmission resources of the message 3 transmitted from the user terminal are set regardless of beam indices, the transmission/reception sections 103 may transmit, in a manner included in the RAR, information relating to the transmission timing of the message 3 (for example, the time elapsed since reception of the RAR).

Figure 9:
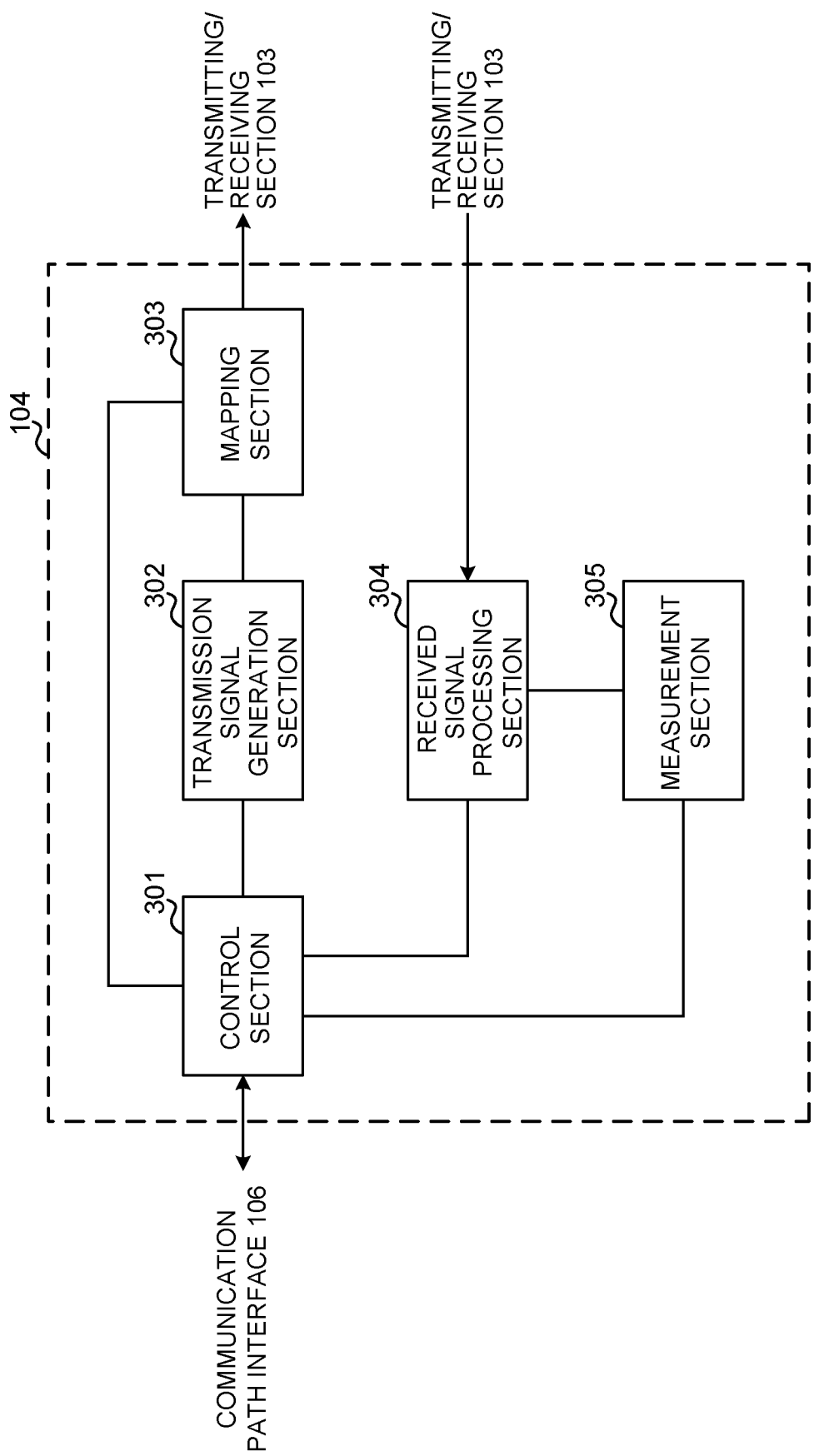
FIG. 9 shows an example of a function configuration of a radio base station according to an embodiment of the present invention.

FIG. 9 shows an example of a function configuration of a radio base station according to an embodiment of the present invention. Note that, the present example mainly shows function blocks of characteristic parts in the present embodiment, and it is assumed that the radio base station 10 also has other function blocks required for radio communication.

The baseband signal processing section 104 is provided with at least a control section (scheduler) 301, a transmission signal generating section 302, a mapping section 303, a received signal processing section 304, and a measuring section 305. It suffices that the components are included in the radio base station 10, and a part or all of the components need not be included in the baseband signal processing section 104.

The control section (scheduler) 301 controls the radio base station 10 as a whole. The control section 301 may include a controller, a control circuit or a control apparatus, which are described on the basis of a common recognition in the technical field of the present invention.

The control section 301 controls, for example, generation of signals by the transmission signal generating section 302, and allocation of signals by the mapping section 303. In addition, the control section 301 controls reception processing of signals by the received signal processing section 304 and measurement of signals by the measuring section 305.

The control section 301 controls scheduling (for example, resource allocation) of system information, a downlink data signal to be transmitted on the PDSCH, and a downlink control signal to be transmitted on the PDCCH and/or the EPDCCH. In addition, the control section 301 controls generation of a downlink control signal (for example, receipt conformation information, etc.) and a downlink data signal, on the basis of the result of determining the necessity of retransmission control on the uplink data signal. In addition, the control section 301 controls scheduling of a synchronization signal (for example, PSS (Primary Synchronization Signal)/SSS (Secondary Synchronization Signal), and a downlink reference signal such as CRS, CSI-RS and DMRS.

In addition, the control section 301 controls scheduling of an uplink data signal to be transmitted on the PUSCH, an uplink control signal (for example, a receipt confirmation signal) to be transmitted on the PUCCH and/or the PUSCH, a random access preamble, an uplink reference signal and the like to be transmitted on the PRACH.

The control section 301 performs control so as to form a transmission beam and/or a reception beams, using digital BF (for example, precoding) by the baseband signal processing section 104 and/or analog BF (for example, phase rotation) by the transmission/reception sections 103.

For example, the control section 301 may perform control during a predetermined period (for example, a sweep period) so as to transmit, in a manner sweeping, one or more beam-specific signals and/or channels (for example, a beam-specific SS, a beam-specific RS, a beam-specific BCH (a broadcast signal), etc.).

The transmission signal section 302 generates a downlink signal (downlink control signal, downlink data signal, downlink reference signal, etc.), on the basis of an instruction from the control section 301, and outputs the generated signal to the mapping section 303. The transmission signal section 302 may include a signal generator, a signal generating circuit, or a signal generating apparatus, which are described on the basis of a common recognition in the technical field of the present invention.

The transmission signal generating section 302 generates, on the basis of an instruction from the control section 301, for example, a DL assignment for notifying allocation information of downlink signals and a UL grant for notifying allocation information of an uplink signal. In addition, downlink data signals are subjected to coding processing and modulation processing in accordance with the coding rate, modulation scheme and the like, which have been determined on the basis of Channel State Information (CSI) and the like from each of the user terminals 20.

The mapping section 303 performs mapping of the downlink signal generated in the transmission signal generating section 302 onto a predetermined radio resource, on the basis of an instruction from the control section 301, and outputs the mapped signal to the transmission/reception section 103. The mapping section 303 may include a mapper, a mapping circuit or a mapping apparatus, which are described on the basis of a common recognition in the technical field of the present invention.

The received signal processing section 304 performs reception processing (for example, demapping, demodulation, decoding, etc.) on the received signal which has been input from the transmission/reception sections 103. Here, the received signal is, for example, an uplink signal (an uplink control signal, an uplink data signal, an uplink reference signal, etc.) transmitted from the user terminal 20. The received signal processing section 304 may include a signal processor, a signal processing circuit, or a signal processing apparatus, which are described on the basis of a common recognition in the technical field of the present invention.

The received signal processing section 304 outputs the information decoded by reception processing to the control section 301. For example, when a PUCCH including a HARQ-ACK has been received, the HARQ-ACK is output to the control section 301. In addition, the received signal processing section 304 outputs the received signals, or signals subjected to reception processing, to the a measuring section 305.

The measuring section 305 performs measurement relating to received signals. The measuring section 305 may include a measuring instrument, a measuring circuit, or a measuring apparatus, which are described on the basis of a common recognition in the technical field of the present invention.

The measuring section 305 may measure, for example, received power of a received signal (for example, RSRP (Reference Signal Received Power)), reception quality (for example, RSRQ (Reference Signal Received Quality), SINR (Signal to Interference plus Noise Ratio), channel state and the like. The result of measurement may be output to the control section 301.

(User Terminal)

Figure 10:
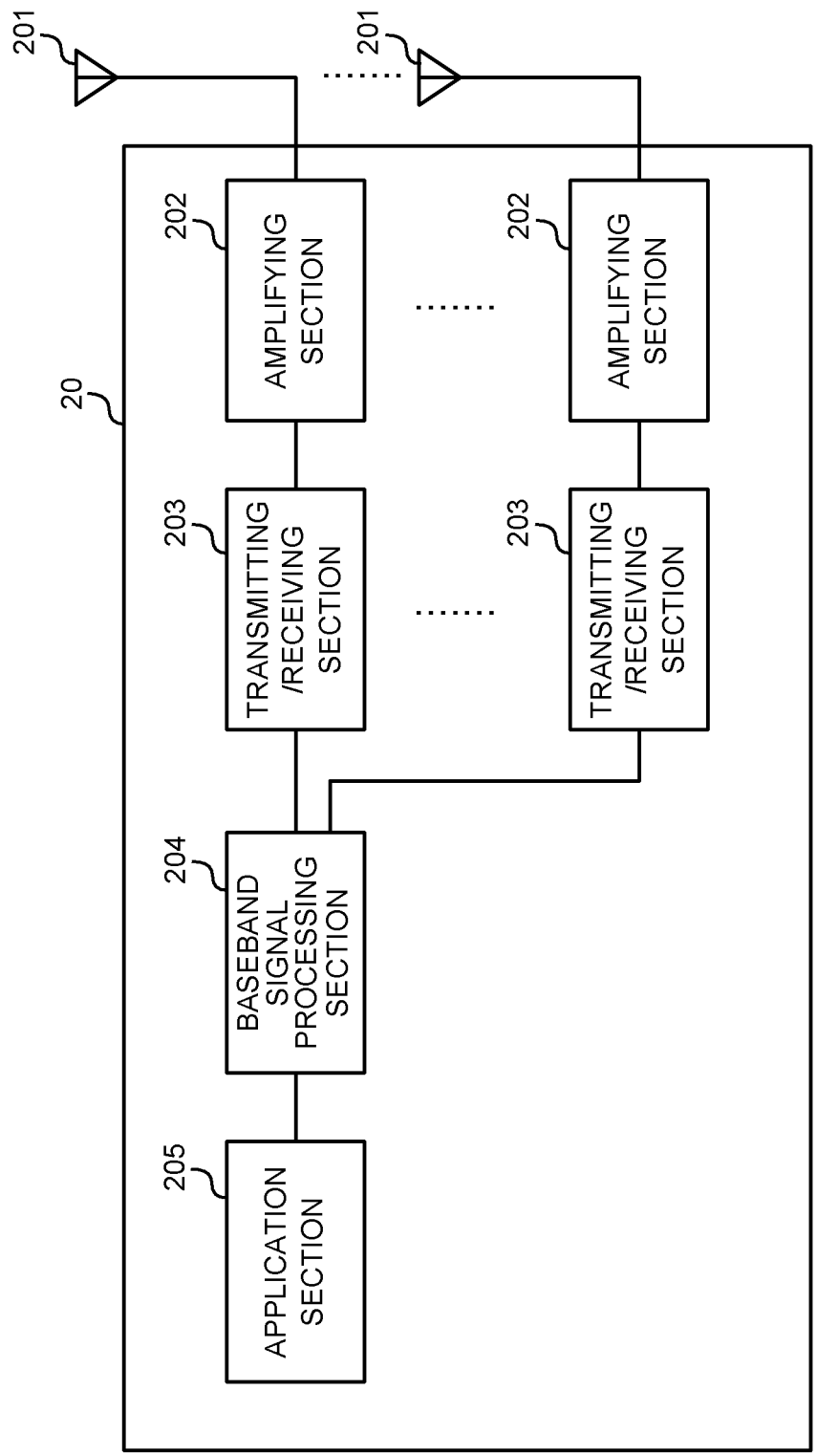
FIG. 10 shows an example of an entire configuration of a user terminal according to an embodiment of the present invention.

FIG. 10 shows an example of an entire configuration of a user terminal according to an embodiment of the present invention. The user terminal 20 is provided with a plurality of transmission/reception antennas 201, amplifying sections 202, transmission/reception sections 203, a baseband signal processing section 204, and an application section 205. Note that it suffices to include, in the configuration, one or more members of the transmission/reception antennas 201, the amplifying sections 202, and the transmission/reception sections 203, respectively.

Radio-frequency signals received by the transmission/reception antennas 201 are amplified by the amplifying sections 202. The transmission/reception section 203 receives downlink signals amplified by the amplifying sections 202. The transmission/reception sections 203 perform frequency conversion of the received signal into baseband signals, and output the converted signals to the baseband signal processing section 204.

The transmission/reception section 203 may include a transmitter/receiver, a transmission/reception circuit, or a transmission/reception apparatus, which are described on the basis of a common recognition in the technical field of the present invention. Note that the transmission/reception sections 203 may be formed as an integrated transmission/reception section, or may include a transmission section and a reception section.

The baseband signal processing section 204 performs FFT processing, error correction decoding, reception processing of retransmission control on the input baseband signals. Downlink user data is transferred to the application section 205. The application section 205 performs processing relating to a higher layer than the physical layer and the MAC layer. In addition, broadcast information, among the downlink data, is also transferred to the application section 205.

On the other hand, uplink user data is input to the baseband signal processing section 204 from the application section 205. The baseband signal processing section 204 performs transmission processing of retransmission control (for example, transmission processing of HARQ), channel coding, precoding, Discrete Fourier Transform (DFT) processing, IFFT processing and the like, and transfers the processed data to the transmission/reception sections 203. The transmission/reception section 203 converts the baseband signal output from the baseband signal processing section 204 into a radio-frequency signal, and transmits the converted signal. The radio-frequency signal which has been frequency-converted in the transmission/reception sections 203 is amplified by the amplifying sections 202 and transmitted from the transmission/reception antennas 201.

Note that the transmission/reception sections 203 may further have an analogue beamforming section that performs analogue beamforming. The analogue beamforming section may include an analogue beamforming circuit (for example, a phase shifter, a phase shift circuit) or an analogue beamforming apparatus (for example, a phase shifter), which are described on the basis of a common recognition in the technical field of the present invention. In addition, the transmission/reception antennas 201 may be formed as an array antenna, for example.

The transmission/reception section 203 control transmission of Msg. 1 and Msg. 3, and reception of Msg. 2 and Msg. 4 in the random access procedure. In addition, the transmission/reception sections 103 may receive setting information (BRS config.) relating to a reference signal for beam pattern measurement and/or information relating to a beam index. In addition, the transmission/reception sections 203 are capable of transmitting Msg. 1 and/or Msg. 3 using resources associated with a predetermined beam group selected from a plurality of beam groups. In addition, the transmission/reception sections 203 are capable of receiving Msg. 2 and/or Msg. 4 using resources associated with a predetermined beam group.

Additionally, in a case where transmission resources of the RAR are set regardless of beam indices, the transmission/reception sections 203 may receive the RAR in arbitrary resources, and also may receive information relating to a fixed interval for receiving the RAR by upper layer signaling (broadcast information and/or RRC signaling, etc.). Additionally, in case where transmission resources of the message 3 are set regardless of beam indices, the transmission/reception sections 203 may receive the RAR including the information relating to the transmission timing of the message 3 (for example, the time elapsed since reception of the RAR).

Figure 11:
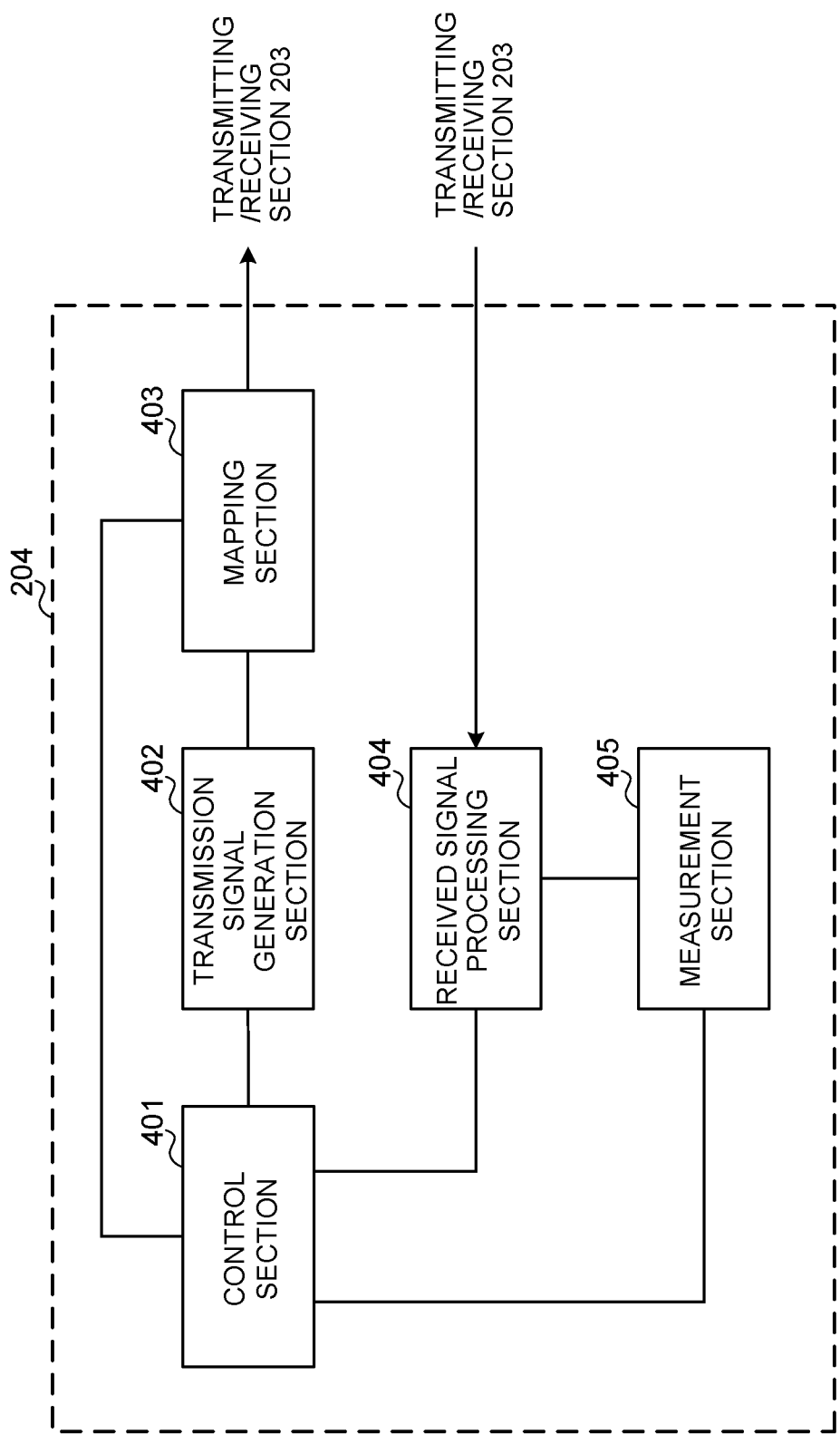
FIG. 11 shows an example of a function configuration of a user terminal according to an embodiment of the present invention.

FIG. 11 shows an example of a function configuration of a user terminal according to an embodiment of the present invention. Note that the present example mainly shows function blocks of characteristic parts in the present embodiment, and it is assumed that the user terminal 20 has other function blocks required for radio communication.

The baseband signal processing section 204 included in the user terminal 20 is provided with at least a control section 401, a transmission signal generating section 402, a mapping section 403, a received signal processing section 404, and a measuring section 405. It suffices that the components are included in the user terminal 20, and a part or all of the components need not be included in the baseband signal processing section 204.

The control section 401 controls the user terminal 20 as a whole. The control section 401 may include a controller, a control circuit, or a control apparatus, which are described on the basis of a common recognition in the technical field of the present invention.

The control section 401 controls, for example generation of signals by the transmission signal generating section 402, and allocation of signals by the mapping section 403. In addition, the control section 401 controls reception processing of signals by the received signal processing section 404 and measurement of signals by the measuring section 405.

The control section 401 acquires, from the received signal processing section 404, a downlink control signal (a signal transmitted on the PDCCH/EPDCCH) and a downlink data signal (a signal transmitted on the PDSCH) transmitted from the radio base station 10. The control section 401 controls generation of an uplink control signal (for example, a receipt confirmation signal) and an uplink data signal, on the basis of the result of determining the necessity of retransmission control on the downlink control signal and the downlink data signal.

The control section 401 performs control so as to form a transmission beam and/or a reception beam, using digital BF (for example, precoding) by the baseband signal processing section 204 and/or analog BF (for example, phase rotation) by the transmission/reception sections 203.

For example, the control section 401 may perform control so as to receive at least one of a plurality of beam-specific signals and/or channels (for example, a beam-specific SS, a beam-specific RS, a beam specific BCH (broadcast signal), etc.) transmitted during a predetermined period (for example, sweep period).

In addition, the control section 401 controls transmission of Msg. 1 and/or Msg. 3 using resources respectively set to a plurality of beam groups including different beam patterns. In addition, the control section 401 controls reception of Msg. 2 and/or Msg. 4 using resource respectively set to a plurality of beam groups including different beam patterns.

In addition, the control section 401 is capable of selecting a predetermined beam group on the basis of at least one of the synchronization signal, the broadcast signal, and the beam reference signal, which are received from the radio base station prior to transmission of the random access preamble.

The transmission signal section 402 generates an uplink signal (an uplink control signal, an uplink data signal, an uplink reference signal, etc.), on the basis of an instruction from the control section 401, and outputs the generated signal to the mapping section 403. The transmission signal section 402 may include a signal generator, a signal generating circuit, or a signal generating apparatus, which are described on the basis of a common recognition in the technical field of the present invention.

The transmission signal generating section 402 generates a receipt confirmation signal or an uplink control signal relating to the channel status information (CSI), on the basis of, for example, an instruction from the control section 401. In addition, the transmission signal generating section 402 generates an uplink data signal, on the basis of an instruction from the control section 401. For example, the transmission signal generating section 402 is instructed by the control section 401 to generate an uplink data signal in a case where a UL grant is included in a downlink control signal notified from the radio base station 10.

The mapping section 403 performs mapping of the uplink signal generated in the transmission signal generating section 402 onto a radio resource, on the basis of an instruction from the control section 401, and outputs the mapped signal to the transmission/reception section 203. The mapping section 403 may include a mapper, a mapping circuit, or a mapping apparatus, which are described on the basis of a common recognition in the technical field of the present invention.

The received signal processing section 404 performs reception processing (for example, demapping, demodulation, decoding, etc.) on the received signal which has been input from the transmission/reception sections 203. Here, the received signal is, for example a downlink signal (a downlink control signal, a downlink data signal, a downlink reference signal, etc.) transmitted from the radio base station 10. The received signal processing section 404 may include a signal processor, a signal processing circuit, or a signal processing apparatus, which are described on the basis of a common recognition in the technical field of the present invention. In addition, the received signal processing section 404 may form a reception section according to the present invention.

The received signal processing section 404 outputs the information decoded by reception processing to the control section 401. The received signal processing section 404 outputs, for example, broadcast information, system information, RRC signaling, DCI and the like to the control section 401. In addition, the received signal processing section 404 outputs received signals or signals subjected to reception processing to the measuring section 405.

The measuring section 405 performs the measurement relating to received signals. For example, the measuring section 405 performs the measurement using the beam forming RS transmitted from the radio base station 10. The measuring section 405 may include a measuring instrument, a measurement circuit, or a measuring apparatus, which are described on the basis of a common recognition in the technical field of the present invention.

The measuring section 405 may measure, for example, received power of a received signal, (for example, RSRP), reception quality (for example, RSRQ, received SINR), channel state and the like. The result of measurement may be output to the control section 401.

(Hardware Configuration)

Note that the block diagrams used for explanation of the above-mentioned embodiments show blocks in terms of functions. The function blocks (component sections) are realized by any combination of hardware and/or software. In addition, realization means of each function block is not limited in particular. In other words, each function block may be realized by a physically and/or logically integrated apparatus, or may be realized by two or more physically and/or logically separated apparatuses which have been directly and/or indirectly connected (for example, in a wired and/or wireless manner).

Figure 12:
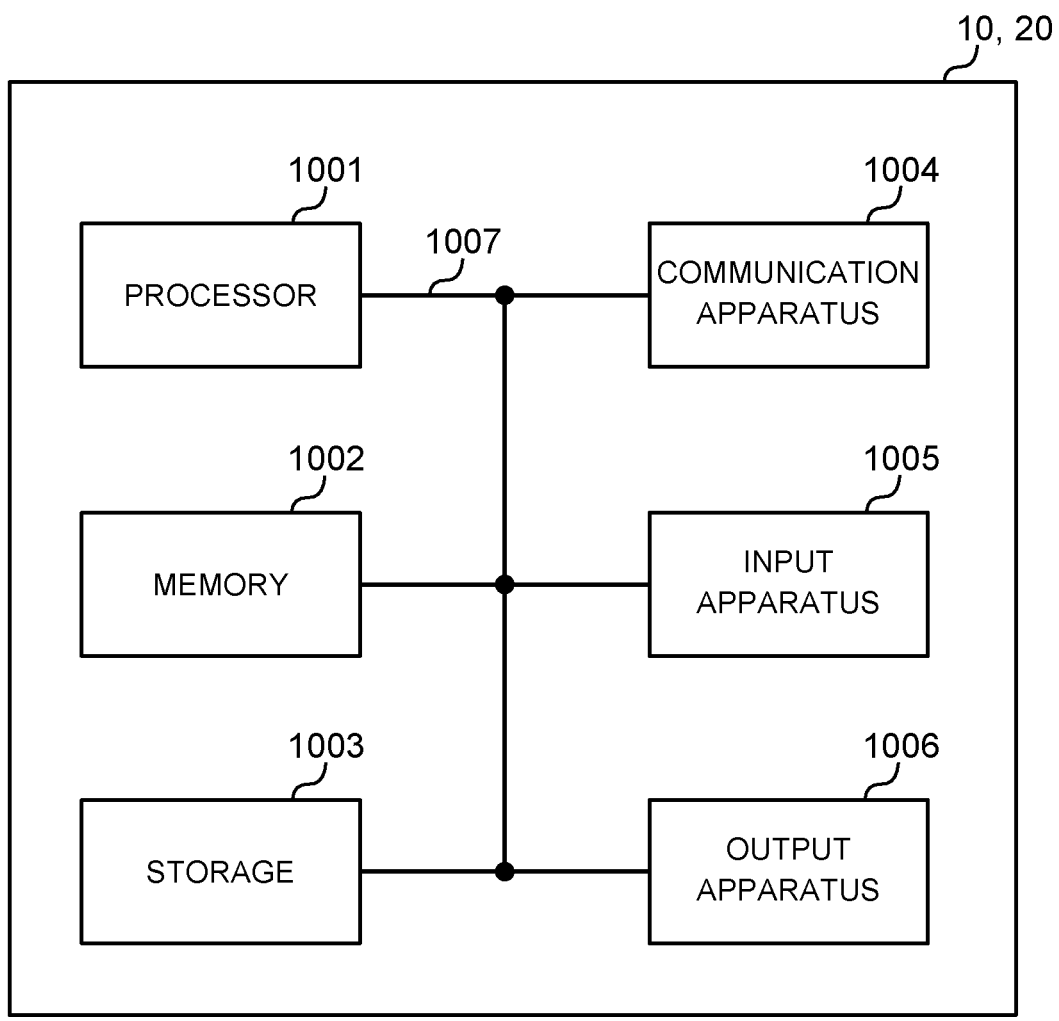
FIG. 12 shows an example of a hardware configuration of a radio base station and user terminal according to an embodiment of the present invention.

For example, the radio base station and the user terminal in an embodiment of the present invention may function as a computer that performs processing of the radio communication method of the present invention. FIG. 12 shows an example of a hardware configuration of a radio base station and a user terminal according to an embodiment of the present invention. The radio base station 10 and the user terminal 20 described above may be physically formed as a computer apparatus including a processor 1001, a memory 1002, a storage 1003, a communication apparatus 1004, an input apparatus 1005, an output apparatus 1006, a bus 1007, and the like.

Note that, in the following description, the term "apparatus" may be replaced by "circuit", "device", "unit", and the like. The hardware configuration of the radio base station 10 and the user terminal 20 may be formed so as to include one or more members of respective apparatuses shown in the drawing, or may be configured without including some of the apparatuses.

For example, although the processor 1001 is shown as a single member, there may be a plurality of processors. In addition, processing may be performed by a single processor, or may be performed by one or more processors simultaneously, sequentially, or in other manners. Note that the processor 1001 may be implemented by one or more chips.

Each function in the radio base station 10 and the user terminal 20 is realized by reading predetermined software (program) into hardware such as the processor 1001 and memory 1002, for example, and performing operation by the processor 1001 so as to control communication performed by the communication apparatus 1004 and reading and/or writing of data from and to the memory 1002 and the storage 1003.

The processor 1001 controls the entire computer by running an operating system, for example. The processor 1001 may include a Central Processing Unit (CPU) including interfaces with peripheral apparatuses, a control apparatus, an arithmetic operation apparatus, a register and the like. For example, the above-mentioned baseband signal processing section 104 (204), the call processing section 105 and the like may be realized by the processor 1001.

In addition, the processor 1001 reads programs (program codes), software modules, data and the like into the memory 1002 from the storage 1003 and/or the communication apparatus 1004, and performs various processing in accordance therewith. As such programs, programs that cause a computer to perform at least a part of the operation described in the above-mentioned embodiments are used. For example, the control section 401 of the user terminal 20 may be realized by a control program stored in the memory 1002 and executed by the processor 1001, and other function blocks may be realized in a similar manner.

The memory 1002 is a computer-readable storage medium and may include at least one of, for example, a ROM (Read Only Memory), an EPROM (Erasable Programmable ROM), an EEPROM (Electrically EPROM), a RAM (Random Access Memory), or any other appropriate storage medium. The memory 1002 may also be referred to as a register, a cash, a main memory (main storage apparatus), and the like. The memory 1002 is capable of storing programs (program codes), software modules and the like, which may be executed to perform the radio communication method according to an embodiment of the present invention.

The storage 1003 is a computer-readable storage medium, and may include at least one of, for example, a flexible disc, a floppy (registered trademark) disc, a magneto-optical disc (for example, a compact disc (CD-ROM (Compact Disc ROM), etc.), a Digital Versatile Disc, a Blu-ray (registered trademark) disc, a removable disc, a hard disc drive, a smart card, a flash memory device (for example, a card, a stick, a key drive), a magnetic stripe, a database, a server, or any other appropriate storage medium. The storage 1003 may also be referred to as an auxiliary storage apparatus.

The communications apparatus 1004 is hardware (transmission/reception device) for performing communication between computers via a wired and/or wireless network, and is also referred to as, for example, a network device, a network controller, a network card, a communication module, and the like. The communication apparatus 1004 may be configured so as to include a high-frequency switch, a duplexer, a filter, a frequency synthesizer and the like in order to realize, for example, Frequency Division Duplex (FDD) and/or Time Division Duplex (TDD). For example, the transmission/reception antennas 101 (201), the amplifying sections 102 (202), the transmission/reception sections 103 (203), the transmission path interface 106 and the like may be realized by the communication apparatus 1004.

The input apparatus 1005 is an input device (for example, a keyboard, a mouse, a microphone, a switch, a button, a sensor, etc.) for accepting input from the outside. The output apparatus 1006 is an output device performing the output to the outside (for example, a display, a loud speaker, an LED (Light Emitting Diode) lamp, etc.). Note that the input apparatus 1005 and the output apparatus 1006 may be formed in an integrated manner (for example, a touch panel).

In addition, respective apparatuses such as the processor 1001 and the memory 1002 are connected via the bus 1007 for communicating information. The bus 1007 may include a single bus, or may include different buses depending on the apparatuses.

In addition, the radio base station 10 and the user terminal 20 may be configured so as to include hardware such as a microprocessor, a Digital Signal Processor (DSP), an ASIC (Application Specific Integrated Circuit), a PLD (Programmable Logic Device), FPGA (Field Programmable Gate Array) and the like, and a part or all of each function block may be realized by the hardware. For example, the processor 1001 may be implemented by at least one of such hardware.

(Modification)

Note that the terms explained in the present specification and/or the terms required for understanding the present specification may be replaced by terms having identical or similar meanings. For example, "channel" and/or "symbol" may be "signal (signaling)". In addition, "signal" may be "message". "Reference signal" may also be abbreviated as RS (Reference Signal), or may also be referred to as Pilot, a pilot signal, according to the applied standard. In addition, "Component Carrier (CC)" may also be referred to as "cell", "frequency carrier", "carrier frequency", and the like.

In addition, a radio frame may include one or more periods (frames) in the time domain. Each of the one or more periods (frames) included in a radio frame may also be referred to as a subframe. Furthermore, a subframe may include one or more slots in the time domain. Furthermore, a slot may include one or more symbols (OFDM (Orthogonal Frequency Division Multiplexing) symbols, SC-FDMA (Single Carrier Frequency Division Multiple Access) symbols and the like) in the time domain.

All of a radio frame, a subframe, a slot, and a symbol express a time unit when transmitting a signal. Each of the radio frame, subframe, slot, and symbol may be referred using another corresponding nomenclature. For example, a single subframe may also be referred to as a Transmission Time Interval (TTI), a plurality of successive subframes may also be referred to as a TTI, or a single slot may also be referred to as a TTI. In other words, a subframe and TTI may be a subframe in an existing LTE (1 ms), may be a shorter period than 1 ms (for example, 1 to 13 symbols), or may be a longer period than 1 ms.

Here, TTI indicates, for example, the minimum time unit of scheduling in radio communication. For example, in a LTE system, the radio base station performs scheduling for each user terminal so as to allocate radio resources (frequency band width, transmission power and the like, which are available in each user terminal) in units of TTI. Note that the definition of TTI is not limited thereto. A TTI may be a transmission time unit of a channel-coded data packet (transport block), or may turn out to be a unit of processing scheduling, link adaptation, and the like.

A TTI having a time length of 1 ms may also be referred to as an ordinary TTI (TTI in LTE Rel. 8-12), a normal TTI, a long TTI, an ordinary subframe, a normal subframe, or a long subframe. A TTI shorter than an ordinary TTI may be also referred to as a shortened TTI, a short TTI, a shortened subframe, or a short subframe.

A Resource Block (RB) is a resource allocation unit in the time domain and the frequency domain, and may include one or more successive subcarriers in the frequency domain. In addition, an RB may include one or more symbols in the time domain, and may have a length of a single slot, subframe, or TTI. A single TTI and a single subframe may respectively include one or more resource blocks. Note that an RB may also be referred to as a physical resource block (PRB: Physical RB), a PRB pair, an RB pair, and the like.

In addition, a resource block may include one or more Resource Elements (RE). For example, a single RE may be a radio resource domain of a single subcarrier and a single symbol.

Note that the structure of the radio frame, subframe, slot, and symbol is merely exemplary. For example, the number of subframes included in a radio frame, the number of slots included in a subframe, the number of symbols and RBs included in a slot, the number of subcarriers included in an RB, and the number of symbols in a TTI, the symbol length, the Cyclic Prefix (CP) length and the like may be changed in various ways.

In addition, the information, parameters and the like described in the present specification may be expressed as absolute values, may be expressed as values relative to predetermined values, or may be expressed by another corresponding information. For example, radio resources may be those indicated by predetermined indices. Furthermore, the mathematical formulas using the above-mentioned parameters may be different from those explicitly disclosed in the present specification.

The names used for the parameters in the present specification are by no means limiting. For example, various channels (PUCCH (Physical Uplink Control Channel), PDCCH (Physical Downlink Control Channel), etc.) and information elements may be identified using any preferred names, and therefore various names assigned to such various channels and information elements are by no means limiting.

Information, signals and the like described in the present specification may be expressed using any of a variety of different techniques. For example, data, instructions, commands, information, signals, bits, symbols, chips and the like, which may be mentioned all over the foregoing description may be expressed in terms of voltage, electric current, electromagnetic waves, magnetic fields, magnetic particles, optical fields, photons, or any combinations thereof.

In addition, information, signals and the like may be output from upper layers to lower layers, and/or from lower layers to upper layers. Information, signals and the like may be input and output via a plurality of network nodes.

The information, signals and the like which have been input and output may be stored in a particular site (for example, a memory), or may be managed in a management table. The information, signal and the like to be input and output may be subject to overwriting, updating or addition. The output information, signals and the like may be deleted. The information, signals and the like which have been input may be transmitted to other apparatuses.

Notification of information is not limited to the aspects/embodiments described in the present specification, and may be implemented by other methods. For example, notification of information may be performed by physical layer signaling (for example, Downlink Control Information (DCI), Uplink Control Information (UCI), upper layer signaling (for example, RRC (Radio Resource Control) signaling, broadcast information (MIB (Master Information Block), System Information Block (SIB), etc.), MAC (Medium Access Control) signaling) and any other types of signals, or combinations thereof.

Note that physical layer signaling may also be referred to as L1/L2 (Layer 1/Layer 2) control information (L1/L2 control signal), L1 control information (L1 control signal), and the like. In addition, RRC signaling may also be referred to as an RRC message and may be, for example, an RRC Connection Setup (RRCConnectionSetup) message, an RRC Connection Re-configuration (RRCConnectionReconfiguration) message, and the like. In addition, MAC signaling may be notified by a MAC Control Element (MAC CE (Control Element)), for example.

In addition, notification of predetermined information (for example, a notification of "being X") is not limited to being explicitly performed, and may be performed implicitly (for example, by not notifying the predetermined information, or by notifying different information).

Determination may be performed by a value expressed by one bit (0 or 1), or may be performed by a truth value (boolean) expressed as true or false, or may be performed by numerical comparison (for example, comparison with a predetermined value).

Software, regardless of whether it is referred to as software, firmware, middleware, microcode, hardware description language, or being referred to by other names, should be interpreted to cover a wide range of meaning such as an instruction, instruction set, code, code segment, program code, program, subprogram, software module, application, software application, software package, routine, subroutine, object, executable file, execution thread, procedure, function, and the like.

In addition, software, instruction, information and the like may be transmitted and received via a transmission medium. For example, in a case where software is transmitted from a website, server, or other remote sources using a wired technique (coaxial cable, optical fiber cable, twisted pair, Digital Subscriber Line (DSL), etc.) and/or a wireless technique (infrared, microwave, etc.), such a wired technique and/or wireless technique is included within the definition of the transmission medium.

The terms "system" and "network" used in the present specification are interchangeably used.

In the present specification, the terms "Base Station (BS)", "radio base station", "eNB", "cell", "sector", "cell group", "carrier", and "component carrier" may be interchangeably used. A base station may also be referred to by terms such as fixed station, NodeB, eNodeB (eNB), access point, transmission point, reception point, femto-cell, small cell, and the like.

A base station is capable of accommodating one or more (for example, three) cells (which may also be referred to as sectors). When a base station accommodates a plurality of cells, the entire coverage area of the base station may be divided into a plurality of smaller areas, each smaller area being capable of providing communication service by a base station subsystem (for example, an indoor compact base station (RRH: Remote Radio Head). The terms "cell" or "sector" indicate a part or all of the coverage area of a base station and/or a base station subsystem providing communication service within the coverage.

In the present specification, the terms "Mobile Station (MS)", "user terminal", "User Equipment (UE)", and "terminal" may be interchangeably used. A base station may also be referred to by terms such as fixed station, NodeB, eNodeB (eNB), access point, transmission point, reception point, femto-cell, small cell, and the like.

A mobile station may also be referred to, by those skilled in the art, as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other appropriate terms.

In addition, the radio base station in present specification may be replaced by user terminals. For example, respective aspects/embodiments of the present invention may be applied to a configuration in which communication between the radio base station and user terminals is replaced by communication between a plurality of user terminals (D2D: Device-to-Device). In this case, there may also be a configuration in which the user terminal 20 has the function included in the radio base station 10. In addition, words such as "uplink" and "downlink" may be replaced by "side". For example, an uplink channel may be replaced by a side channel.

Similarly, user terminals in the present specification may be replaced by a radio base station. In this case, there may also be a configuration in which the radio base station 10 has the function included in the user terminal 20.

In the present specification, particular operations supposed to be performed by the base station may be performed by an upper node in accordance with the situation. In a network including one or more network nodes having a base station, it is apparent that various operations performed for communication with terminals may be performed by a base station, one or more network nodes (which may be, but not limited to, for example, MME (Mobility Management Entity), S-GW (Serving-Gateway), etc.) other than the base station, or combinations thereof.

Respective aspects/embodiments described in the present specification may be used alone, may be used in combination, or may be used in a switching manner during execution. In addition, the order in the processing procedures, sequences, flowcharts and the like of respective aspects/ embodiments described in the present specification may be interchanged provided that there is no contradiction. For example, the method described in the present specification, while presenting elements of various steps in an exemplary order, is not limited to the presented particular order.

Respective aspects/embodiments described in the present specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications) CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and any other systems using appropriate radio communication methods and/or a next-generation system enhanced on the basis thereof.

The phrase "on the basis of" used in the present specification does not mean "on the basis of only" unless otherwise explicitly stated. In other words, the phrase "on the basis of" has the meaning of both "on the basis of only" and "on the basis of at least".

Any reference to elements using ordinals such as "first" "second" used in the present specification does by no means limit the amount or order of the elements in general. The ordinals may be used in the present specification as a method for conveniently distinguishing between two or more elements. Therefore, reference to a first and a second elements does not mean that only two elements are employed, or that the first element must precede the second element in any way.

The phrase "determining" used in the present specification may cover a variety of operations. For example, "determining" may be regarded as "determining" execution of "calculating", "computing", "processing", "deriving", "investigating", "looking up" (for example, looking up in a table, a database, or another data structure), "ascertaining", and the like. In addition, "determining" may be regarded as "determining" execution of "receiving" (for example, receiving information), "transmitting" (for example, transmitting information), "inputting", "outputting", "accessing" (for example, accessing data in the memory), and the like. In addition, "determining" may be regarded as "determining" execution of "resolving", "selecting", "choosing", "establishing", "comparing", and the like. In other words, "determining" may be regarded as "determining" a certain operation.

The phrases "connected", "coupled", or any flexion thereof used in the present specification means any direct or indirect connection or coupling between two or more elements, and may include existence of one or more intermediate elements between two elements which are "connected" or "coupled" to each other. Coupling or connection between elements may be physical, logical, or a combination thereof. When used in the present specification, two elements may be considered to be "connected" or "coupled" to each other by using one or more electric wires, cables and/or printed electric connection, or by using, as some non-limiting and non-comprehensive examples, electromagnetic energy such as electromagnetic energy having a wavelength in the radio-frequency domain, the microwave domain, and the optical (both visible and invisible) domain.

When the phrases "including", "comprising", or any flexion thereof are used in the present specification or claims, they are intended to be comprehensive, similarly to the phrase "being provided with". Furthermore, the phrase "or" used in the present specification or claims is not intended indicate an exclusive logical sum.

As described above, the present invention is specifically described using the above-mentioned Embodiment, but it is obvious to a person skilled in the art that the invention is not limited to the Embodiment described in the Description. The invention is capable of being carried into practice as modified and changed aspects without departing from the spirit and scope of the invention defined by the descriptions of the claims. Accordingly, the descriptions of the Description are intended for illustrative explanation, and do not have any restrictive meaning to the invention.

The present application is based on Japanese Patent Application No. 2016-140716 filed on Jul. 15, 2016 and Japanese Patent Application No. 2016-158890 filed on Aug. 12, 2016, entire content of which is expressly incorporated by reference herein.

The invention claimed is:

1. A terminal comprising:
a receiver that receives a synchronization signal and a broadcast channel; and
a processor that controls to transmit a random access preamble by using a resource that is configured associated with the synchronization signal and the broadcast channel,
wherein the resource used for transmitting the random access preamble is associated with a plurality of synchronization signals and broadcast channels including the received synchronization signal and broadcast channel, and
the processor controls reception of a response signal to the random access preamble based on timing of the resource.

2. The terminal according to claim 1, wherein the receiver receives information about association of the synchronization signal and the broadcast channel with the resource.

3. A radio communication method comprising:
receiving a synchronization signal and a broadcast channel;
controlling to transmit a random access preamble by using a resource that is configured associated with the synchronization signal and the broadcast channel; and
controlling reception of a response signal to the random access preamble based on timing of the resource,
wherein the resource used for transmitting the random access preamble is associated with a plurality of synchronization signals and broadcast channels including the received synchronization signal and broadcast channel.

4. A base station comprising:
a transmitter that transmits a synchronization signal and a broadcast channel; and
a processor that controls to receive a random access preamble by using a resource that is configured associated with the synchronization signal and the broadcast channel,
wherein the resource used for receiving the random access preamble is associated with a plurality of synchronization signals and broadcast channels including the transmitted synchronization signal and broadcast channel, and the processor controls transmission of a response signal to the random access preamble based on timing of the resource.

5. A system comprising a terminal and a base station, wherein:

the terminal comprises:
- a receiver that receives a synchronization signal and a broadcast channel; and
- a processor that controls to transmit a random access preamble by using a resource that is configured associated with the synchronization signal and the broadcast channel,
- wherein the resource used for transmitting the random access preamble is associated with a plurality of synchronization signals and broadcast channels including the received synchronization signal and broadcast channel, and
- the processor controls transmission of a response signal to the random access preamble based on timing of the resource; and the base station comprises:
- a transmitter that transmits the synchronization signal and the broadcast channel; and
- a processor that controls to receive the random access preamble by using the resource,
- wherein the resource used for receiving the random access preamble is associated with the plurality of synchronization signals and broadcast channels including the transmitted synchronization signal and broadcast channel, and
- the processor controls transmission of the response signal to the random access preamble based on timing of the resource.

* * * * *